(12) United States Patent
Sapaliga et al.

(10) Patent No.: US 9,760,358 B2
(45) Date of Patent: Sep. 12, 2017

(54) SYSTEM AND METHOD FOR TEST TO PRODUCTION SUPPORT IN A CLOUD PLATFORM ENVIRONMENT

(71) Applicant: ORACLE INTERNATIONAL CORPORATION, Redwood Shores, CA (US)

(72) Inventors: Bhavanishankara Sapaliga, Bangalore (IN); Rajiv Mordani, Sunnyvale, CA (US); Nazrul Islam, Santa Clara, CA (US); Chanda Patel, Milpitas, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

(21) Appl. No.: 14/515,351

(22) Filed: Oct. 15, 2014

(65) Prior Publication Data
US 2015/0120893 A1    Apr. 30, 2015

Related U.S. Application Data

(60) Provisional application No. 61/897,723, filed on Oct. 30, 2013.

(51) Int. Cl.
*G06F 15/177* (2006.01)
*G06F 9/445* (2006.01)
(Continued)

(52) U.S. Cl.
CPC .............. *G06F 8/61* (2013.01); *G06F 8/60* (2013.01); *G06F 11/07* (2013.01);
(Continued)

(58) Field of Classification Search
USPC ................ 709/218, 220, 222, 217
See application file for complete search history.

(56) References Cited

U.S. PATENT DOCUMENTS 8,769,049 B2    7/2014  Murphy
2012/0324069 A1*  12/2012  Nori ............... H04L 41/0806
                                                    709/222

(Continued)

OTHER PUBLICATIONS

United States Patent and Trademark Office, Office Action Dated Nov. 23, 2016 for U.S. Appl. No. 14/515,353, 12 pages.

(Continued)

*Primary Examiner* — Liangche A Wang
(74) *Attorney, Agent, or Firm* — Tucker Ellis LLP

(57) ABSTRACT

In accordance with an embodiment, described herein is a system and method for replicating a source service domain to a target service domain in a cloud computing platform environment. In accordance with an embodiment, the system comprises a cloud platform component provided as an installable software suite within the cloud environment, that supports provisioning of enterprise applications; a test to production (T2P) framework module that includes a plurality of T2P plugins and a PaaS plugin; and a user interface where an administrator or a user can invoke the plugins to replicate a source service domain to a target service domain. The system allows a user to manually customize move plans for service domain configurations based on the requirements of the target service domain, and recreate the configurations in the target service domain in accordance with the customized move plans.

20 Claims, 35 Drawing Sheets

(51) Int. Cl.
*G06F 11/07* (2006.01)
*H04L 29/08* (2006.01)
*H04L 12/24* (2006.01)

(52) U.S. Cl.
CPC ...... *H04L 41/0853* (2013.01); *H04L 41/0856* (2013.01); *H04L 41/5041* (2013.01); *H04L 41/0813* (2013.01); *H04L 41/0846* (2013.01); *H04L 41/5096* (2013.01); *H04L 67/1095* (2013.01)

(56) References Cited

U.S. PATENT DOCUMENTS

| | | | | |
|---|---|---|---|---|
| 2012/0330895 | A1* | 12/2012 | Chavda | G06F 17/30017 707/634 |
| 2013/0091285 | A1* | 4/2013 | Devarakonda | G06F 9/4856 709/226 |
| 2013/0262396 | A1* | 10/2013 | Kripalani | G06F 17/30289 707/674 |
| 2013/0268920 | A1 | 10/2013 | Ursal | |
| 2014/0026194 | A1* | 1/2014 | Smith | G06F 21/6245 726/4 |
| 2014/0359243 | A1* | 12/2014 | Byrd | G06F 3/0629 711/170 |
| 2015/0120886 | A1 | 4/2015 | Sapaliga | |
| 2015/0120889 | A1 | 4/2015 | Sapaliga | |

OTHER PUBLICATIONS

United States Patent and Trademark Office, Office Action Dated Nov. 23, 2016 for U.S. Appl. No. 14/515,355 , 11 pages.

* cited by examiner

SYSTEM AND METHOD FOR TEST TO PRODUCTION SUPPORT IN A CLOUD PLATFORM ENVIRONMENT

CLAIM OF PRIORITY

This application claims the benefit of priority to U.S. Provisional Application titled "SYSTEM AND METHOD FOR PROVIDING INTEGRATION AND TEST TO PRODUCTION SUPPORT IN A CLOUD PLATFORM ENVIRONMENT", Application No. 61/897,723, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and in particular to cross-environment replication of configurations and services in a cloud platform.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. Generally, a cloud computing model enables some of those responsibilities which previously may have been provided by an organization's own information technology department, to instead be delivered as service layers within a cloud environment, for use by consumers (either within or external to the organization, according to the cloud's public/private nature).

As an illustrative example, a cloud computing model can be implemented as Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

In such an environment, it can be beneficial to test that the services of the environment are operating properly. For example, one or more service domains can be installed, configured, customized, and validated in a source or test environment, prior to rolling out those service domains to a target or production environment.

However, replicating such a service domain, for example from a test environment to a production environment, typically requires replicating the configurations and services from the source service domain to the target service domain. Often, this requires considerable effort on the part of an administrator, for example to reapply configuration changes made in the original environment to the new environment. These are the general areas that embodiments of the invention are intended to address.

SUMMARY

In accordance with an embodiment, described herein is a system and method for replicating a source service domain to a target service domain in a cloud computing platform environment. In accordance with an embodiment, the system comprises a cloud platform component provided as an installable software suite within the cloud environment, that supports provisioning of enterprise applications; a test to production (T2P) framework module that includes a plurality of T2P plugins and a PaaS plugin; and a user interface where an administrator or a user can invoke the plugins to replicate a source service domain to a target service domain. The system allows a user to manually customize move plans for service domain configurations based on the requirements of the target service domain, and recreate the configurations in the target service domain in accordance with the customized move plans.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
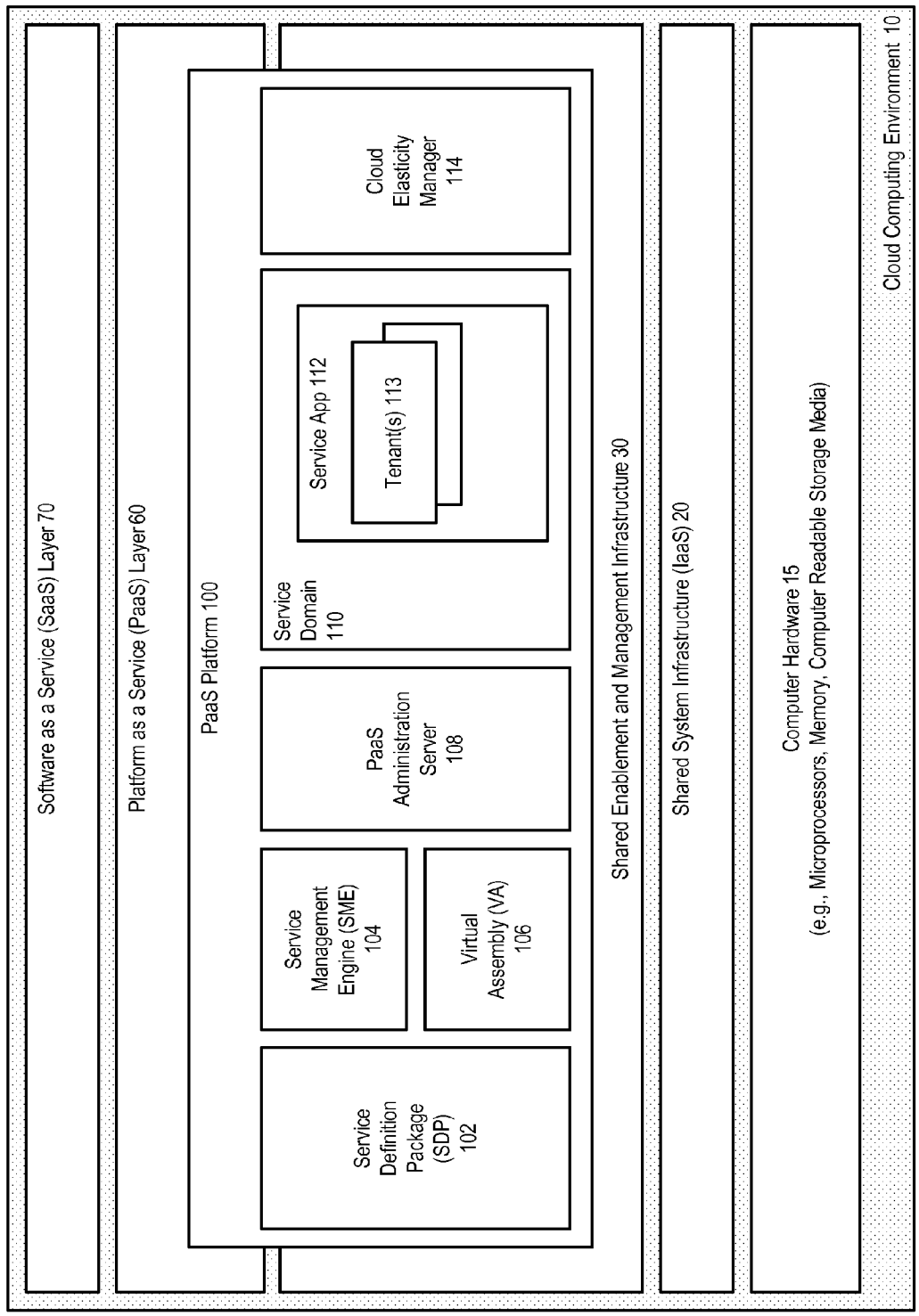
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
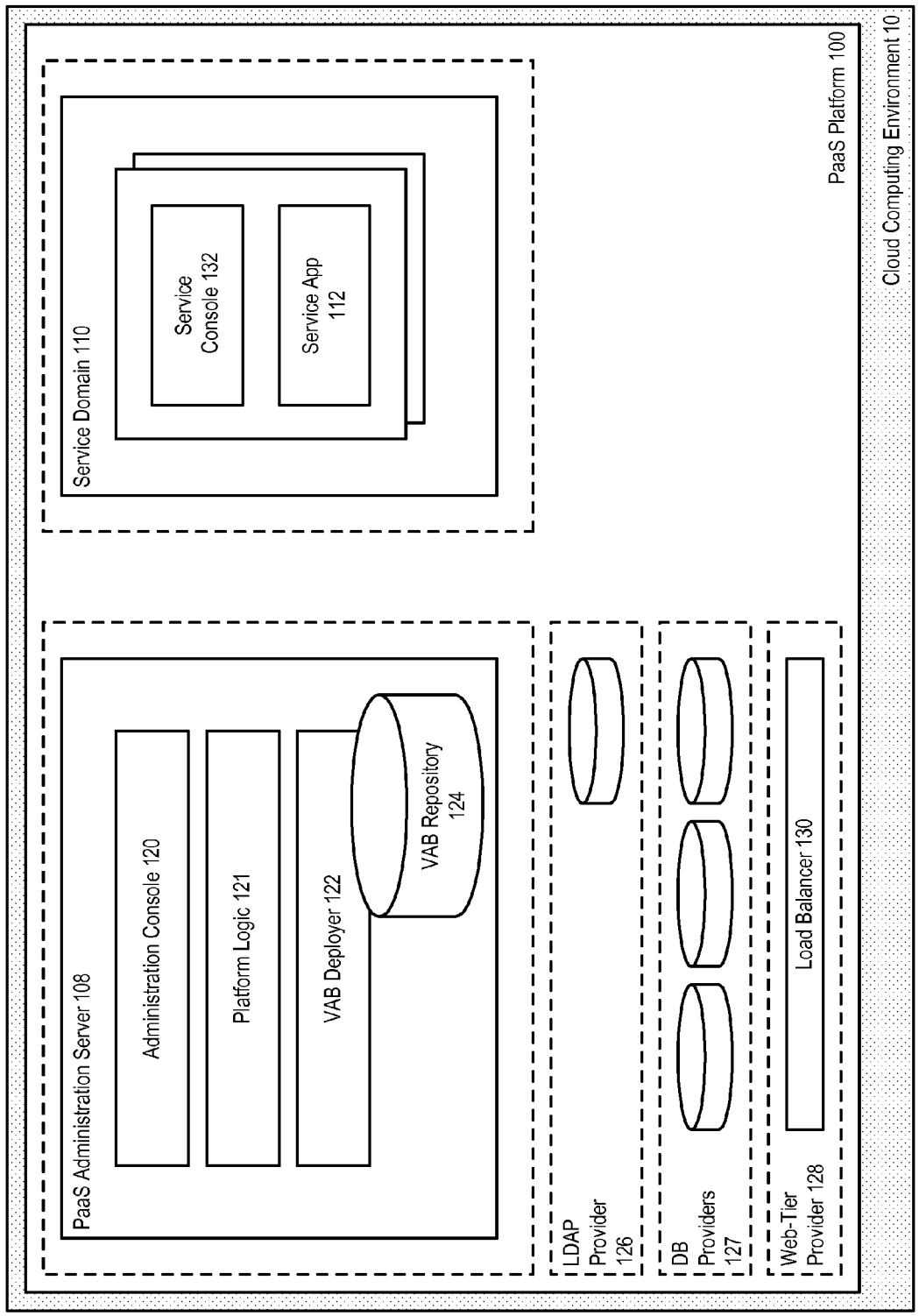
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
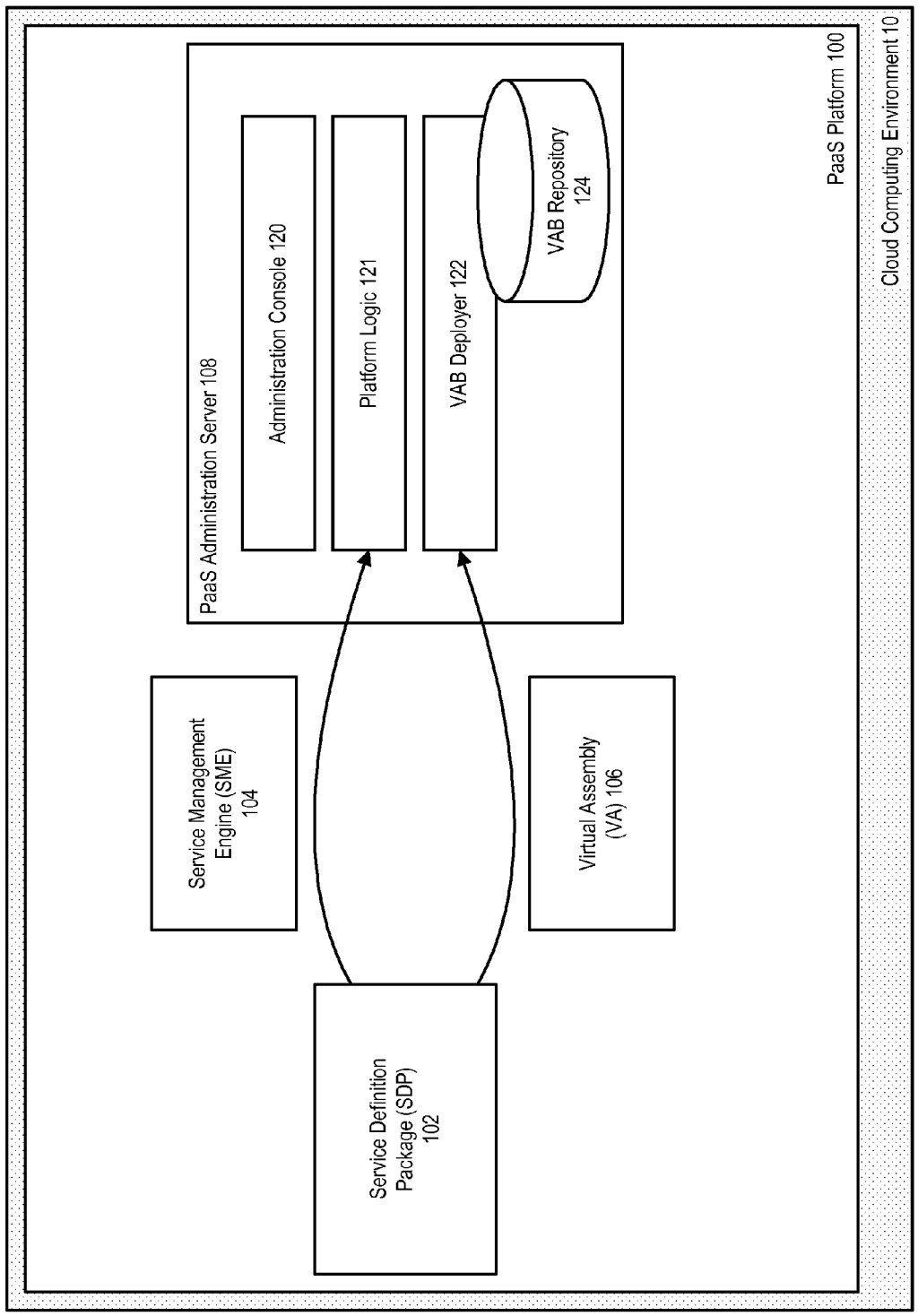
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
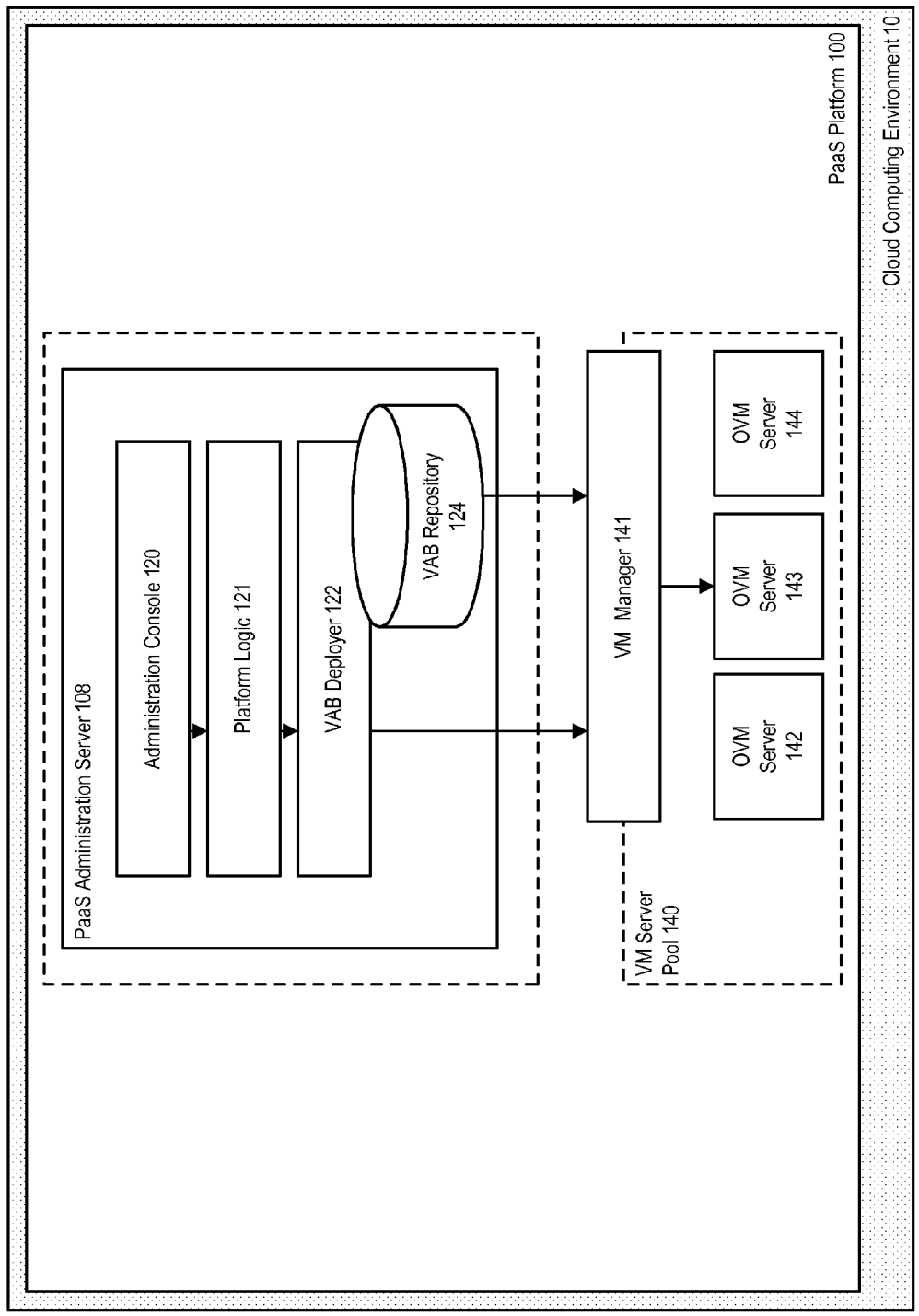
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
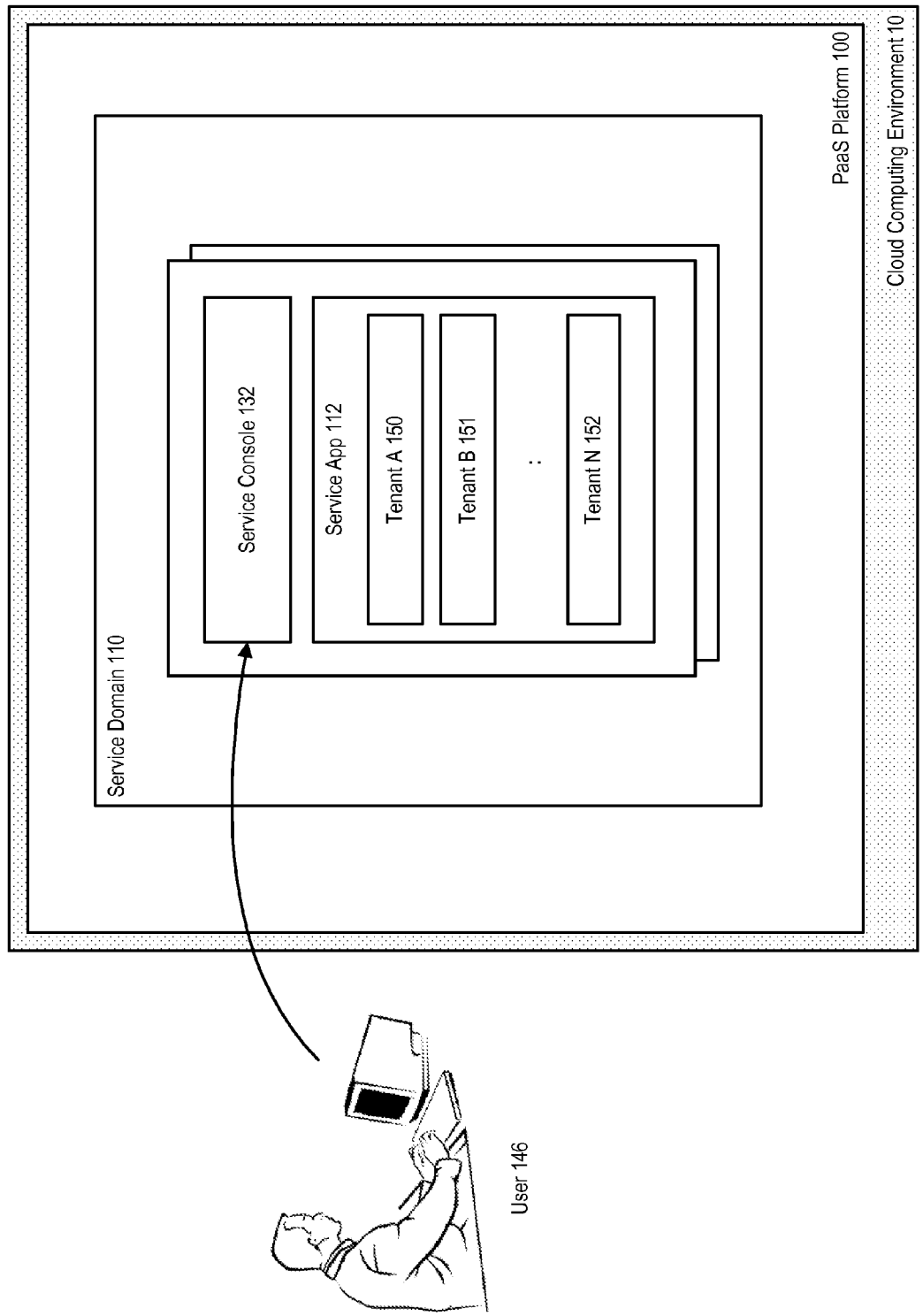
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
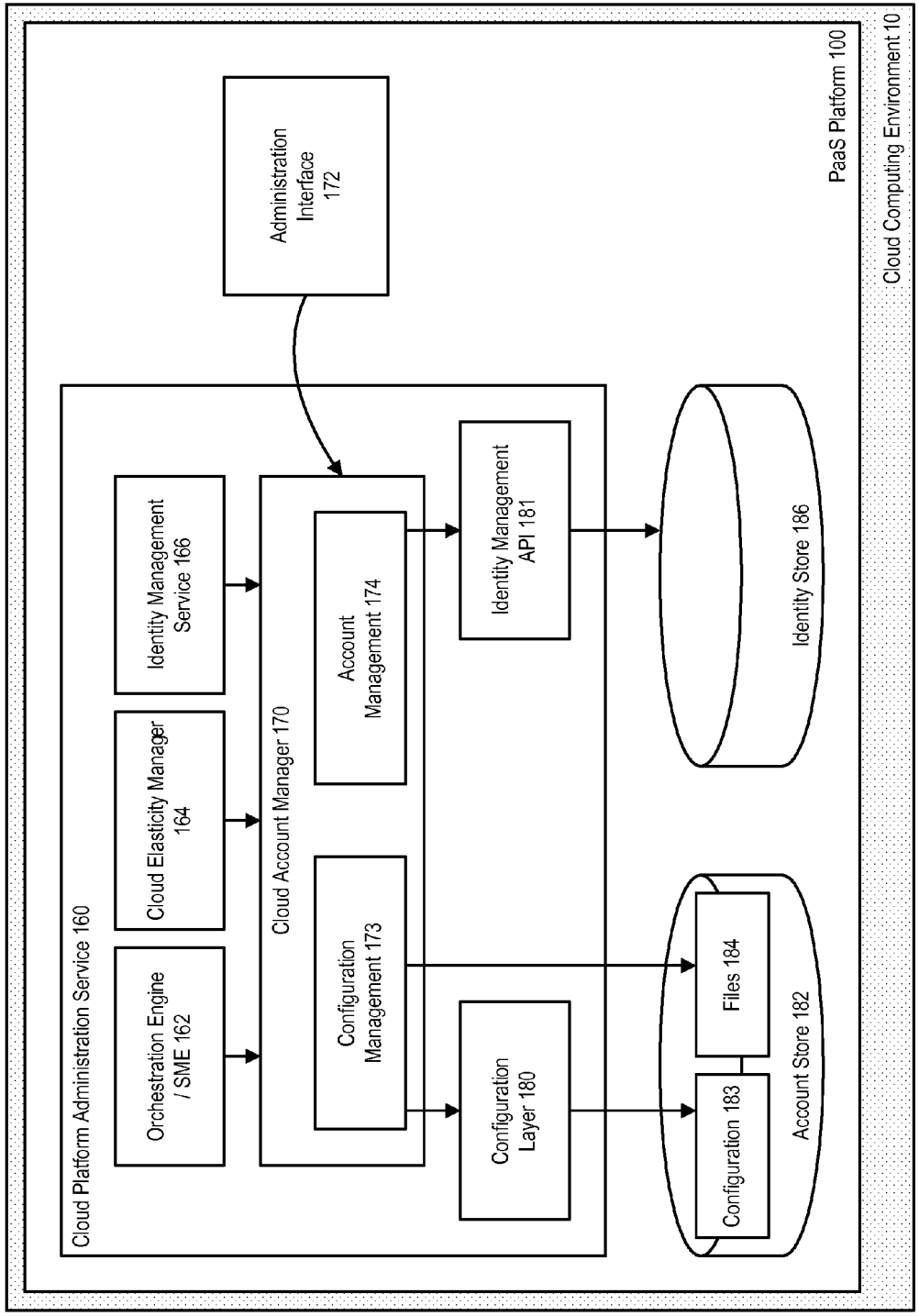
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
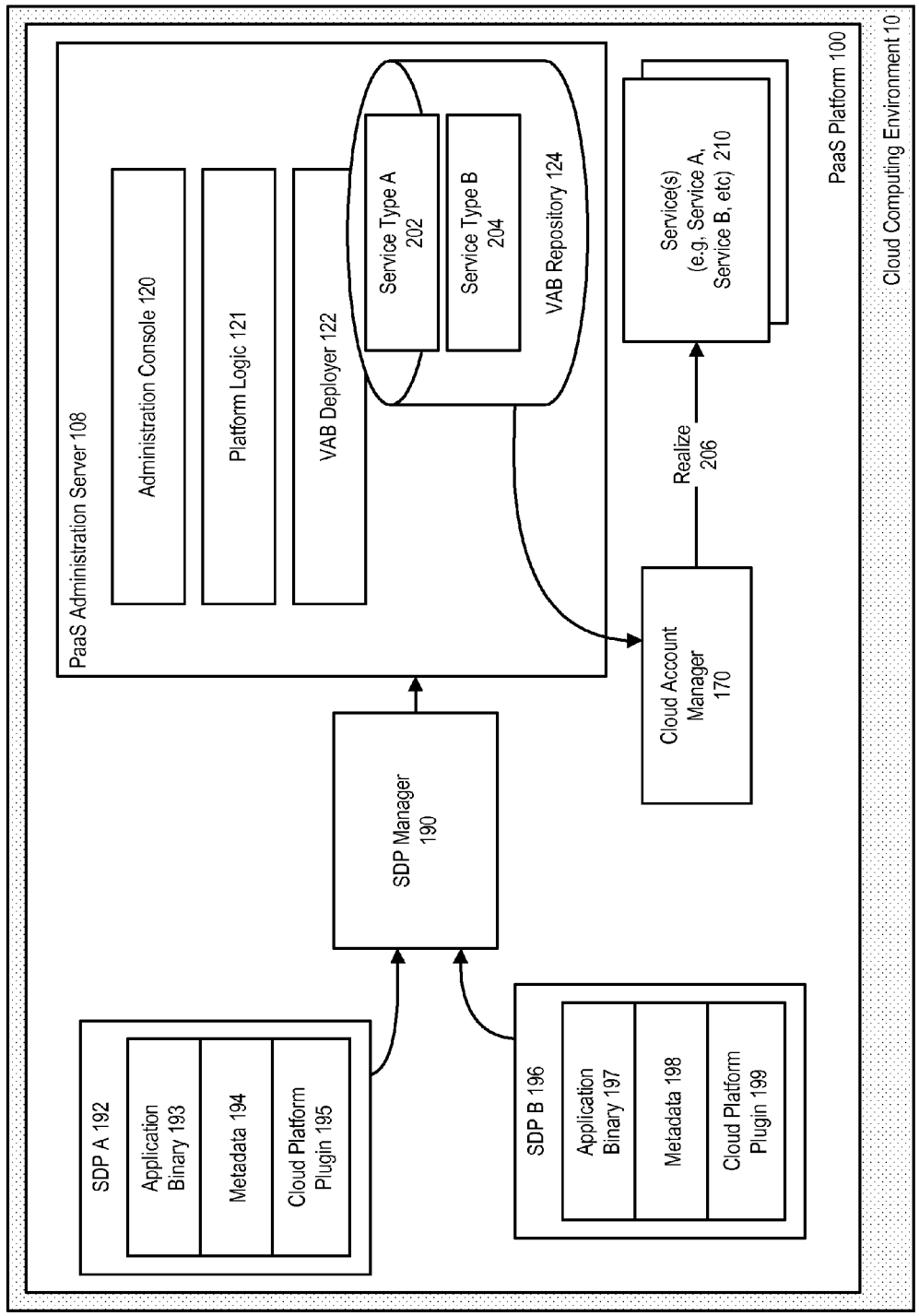
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
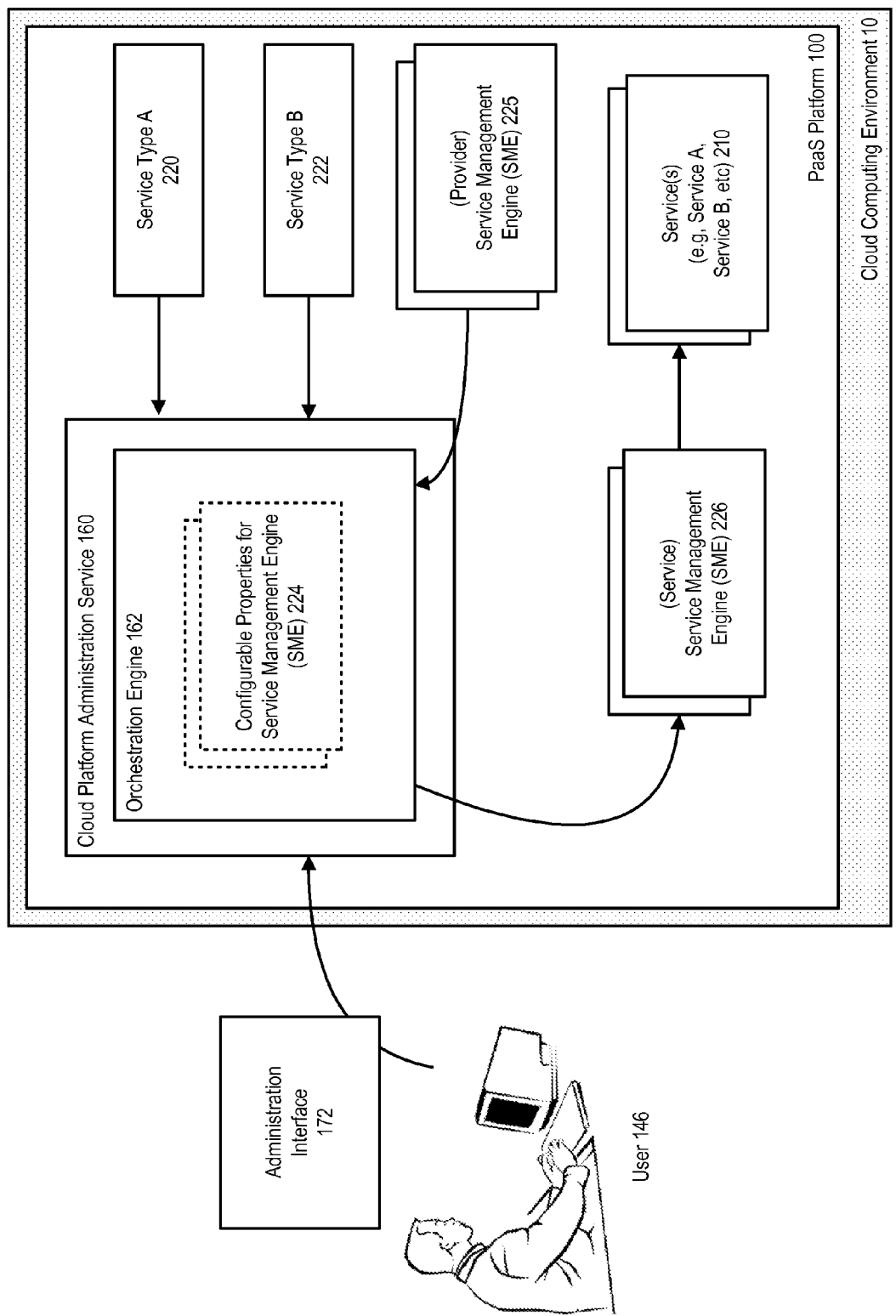
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
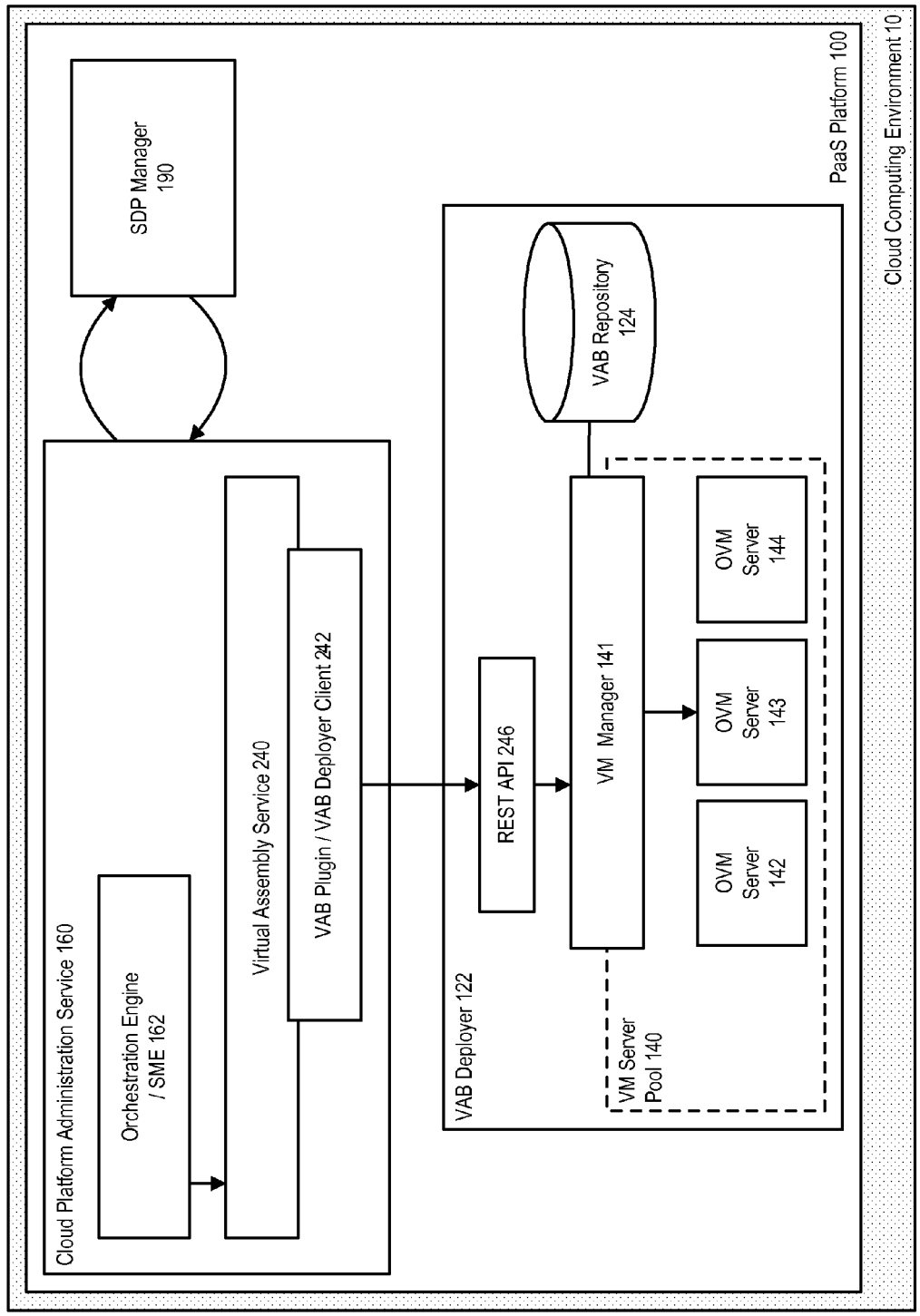
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
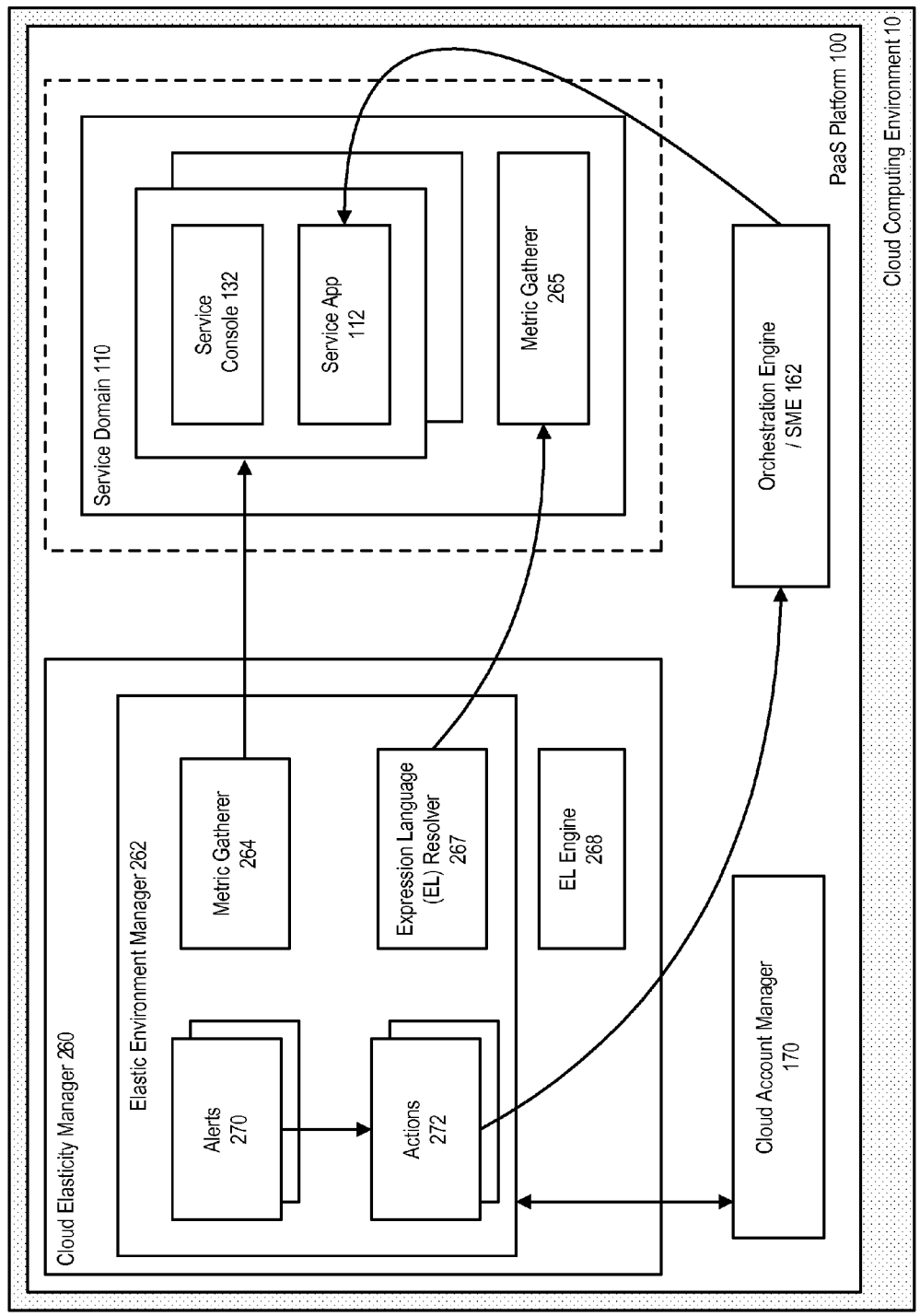
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Service Domain Replication from Source to Target Service Domain

As described above, in accordance with an embodiment, a PaaS or CloudLogic platform can include a plurality of components, e.g., an administration server, a cloud platform provisioning/management logic, and virtual assembly builder (VAB) deployer. In accordance with an embodiment, the PaaS platform can be embedded in an application server runtime, e.g., a WebLogic Server (WLS) runtime, wherein each PaaS platform component can be implemented as a WLS server application, making a Cloud Logic service domain part of a WLS domain.

As such, replicating a CloudLogic domain (i.e., a service domain) across environments can include replicating a WLS installation and CloudLogic components, as well as service domain configurations and WLS configurations.

In accordance with an embodiment, described herein is a system and method for replicating a source service domain to a target service domain in a cloud computing platform environment. In accordance with an embodiment, the system comprises a cloud platform component provided as an installable software suite within the cloud environment, that supports provisioning of enterprise applications; a test to production (T2P) framework module that includes a plurality of T2P plugins and a PaaS plugin; and a user interface where an administrator or a user can invoke the plugins to replicate a source service domain to a target service domain. The system allows a user to manually customize move plans for service domain configurations based on the requirements of the target service domain, and recreate the configurations in the target service domain in accordance with the customized move plans.

In accordance with an embodiment, the domain configurations can include a WLS configuration and a plurality of service domain configurations. Service domain configurations can include a virtualization configuration, a service definition package configuration, a service type configuration, a provider type configuration, a service resource type configuration, and a tenant structure configuration.

In accordance with an embodiment, each service domain can be part of a WLS domain and can share a domain configuration file, e.g., domain.xml, with the WLS domain. The domain configuration file can include one or more segments for the WLS configuration and each service domain configuration. As an illustrative example, a service type configuration can have a <service-type> segment in the domain.xml file. The service type configuration can also include binary files that contain file-parameters associated with different service type revisions.

In accordance with an embodiment, the system can use movement scripts to invoke T2P plugins to replicate the middleware (e.g., a WLS server) and CloudLogic components installed in the middleware; and invoke the T2P plugins and the PaaS plugin to replicate domain configurations (e.g., a WLS configuration and a plurality of service domain configurations), wherein the replication includes extracting move plans for the domain configurations to customize and recreate the domain configurations in a target domain in accordance with the move plans.

In accordance with an embodiment, the system provides the ability to capture configurations, customize them by editing move plans, and migrate the configurations to a target service domain. The complex tasks of setting the target service domain and recreating the service domain configurations in the target service domain in a correct order can be handled by the T2P framework in conjunction with the PaaS plugin.

Figure 11:
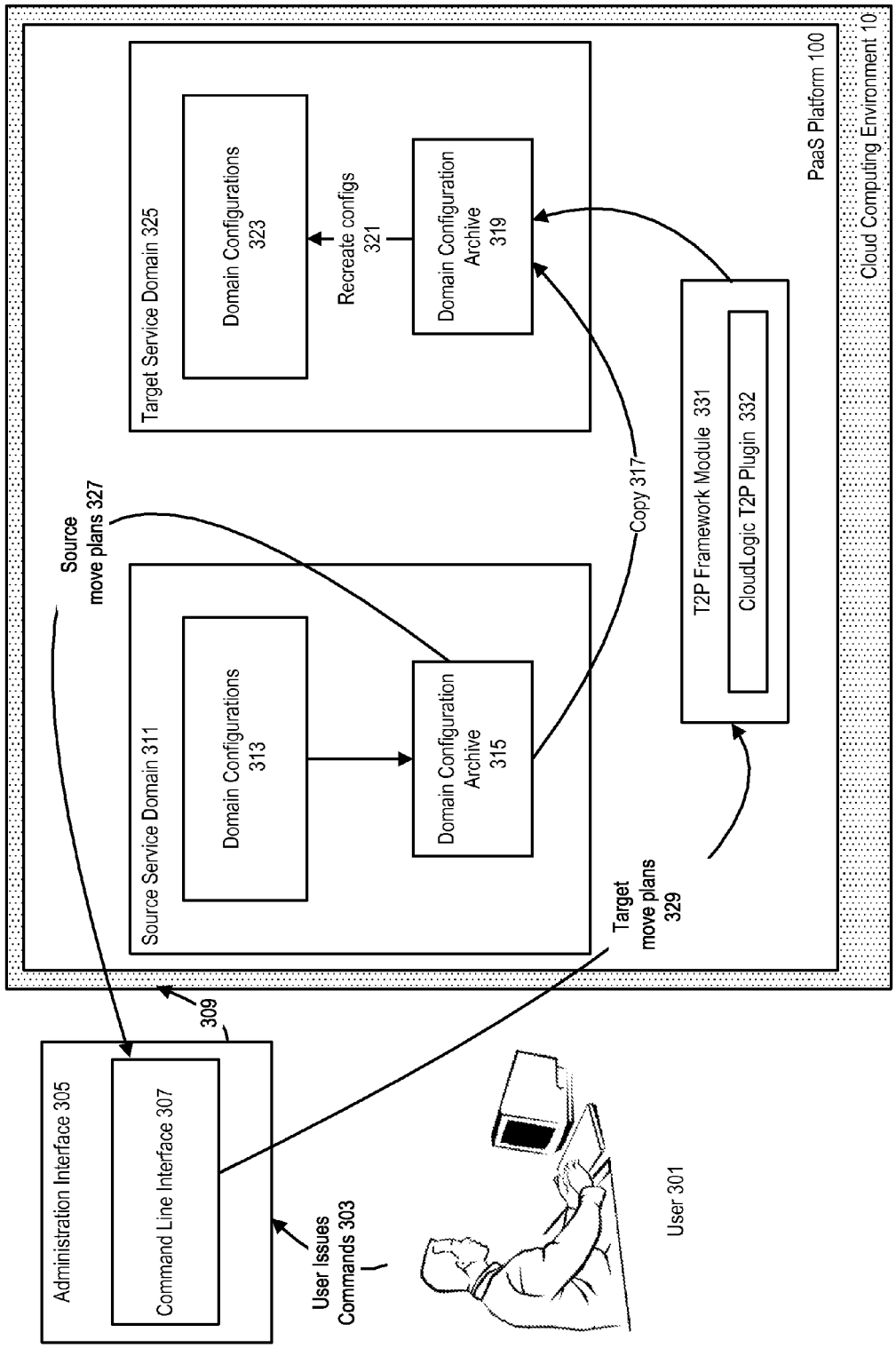
FIG. 11 illustrates a system for use in replicating a source service domain to a target service domain, in accordance with an embodiment.

FIG. 11 illustrates a system for use in replicating a source service domain to a target service domain, in accordance with an embodiment.

As illustrated in FIG. 11, in accordance with an embodiment, the system includes a cloud platform component provided as an installable software suite (e.g., a PaaS platform) within a cloud computing environment, that supports provisioning of enterprise applications. The cloud platform can include a T2P framework module 331, with a PaaS plugin (e.g., a CloudLogic T2P plugin 332), and an administration interface 305 that includes a command line interface 307, wherein a user 301 can issue commands 303 to invoke 309 the T2P framework module.

In accordance with an embodiment, the T2P framework module can include a plurality of Fusion Middleware (FMW) T2P plugins and utilities/tools, which can be used for replicating a source to target service domain, including extracting, copying and pasting binaries, data (applications), and configurations from one domain to another. In accordance with an embodiment, the PaaS plugin is registered with the T2P framework module, so that the T2P framework module can locate and invoke the PaaS plugin.

In accordance with an embodiment, the user can specify, through the command line interface, a source service domain 311 that includes domain configurations 313 to be replicated, and a target service domain 325 to which the domain configurations are to be replicated. Domain configurations can include a WLS configuration and a plurality of service domain configurations, wherein each configuration can be associated a move plan.

In accordance with an embodiment, the user can invoke the T2P framework module and the PaaS plugin to create a domain configuration archive 315 to contain the domain configurations, and extract the source move plans 327 from the configuration archive to a user-specified location, so as to access the move plans to customize them in accordance with the requirements of the target service domain. Once the domain configuration archive is copied 317 to the target service domain as a domain configuration archive 319, the PaaS plugin can be invoked to recreate 321 the domain configurations 323 in the target service domain, in accordance with the customized target move plans 329.

Figure 12:
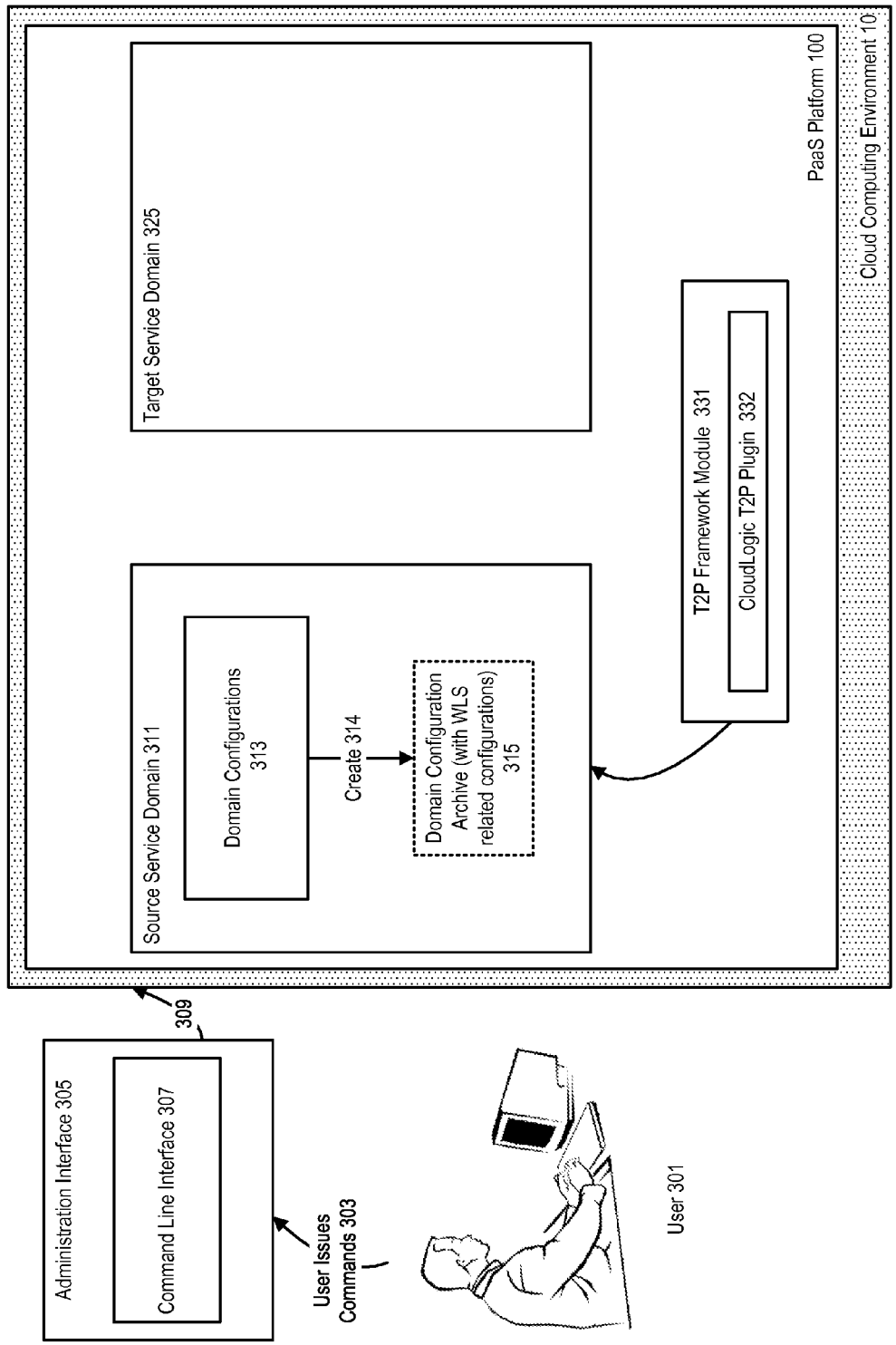
FIG. 12 illustrates a system for use in migrating domain configurations from a source service domain to a target service domain, in accordance with an embodiment.

FIG. 12 illustrates a system for use in migrating domain configurations from a source service domain to a target service domain, in accordance with an embodiment.

In accordance with an embodiment, the domain configuration archive can be created 314 from the domain configurations using a single command, e.g., CopyConfig.sh, to invoke a WLS T2P plugin of the T2P framework module. The domain configuration archive, when it is created, can include a middleware (e.g., WebLogic Server (WLS)) related configuration.

In accordance with an embodiment, the WLS T2P plugin can create a move plan for the WLS configuration, wherein the move plan can include one or more move plan files that can capture customizable WLS configuration parameters. An example of the contents of the domain configuration archive can be illustrated in Listing 1:

---
Listing 1
---

META-INF/MANIFEST.MF
CLONE20130717174007748_CLONE_ALL_SRCID_MAP_FILE_1374108008035
Clientjar/cloningclient.jar
CLONExxx-J2EECOMPONENT@myCloudDomain/REPOSITORY/
packed.domain.jar
CLONExxxJ2EECOMPONENT@myCloudDomain/REPOSITORY/configplans/
moveplan.xml
CLONExxx-J2EECOMPONENT@myCloudDomain/REPOSITORY/configplans/deployment
_plans/**.xml
CLONExxx-J2EECOMPONENT@myCloudDomain/REPOSITORY/ldapdata/***.dat

---

As shown in Listing 1, in accordance with an embodiment, the files under REPOSITORY/configplans are the move plan files. The configplans/moveplan.xml captures the customizable WLS configurations. The customization can also be made directly to the configplans/deployment_plans/**.xml files. A domain configuration archive can include other middleware-related configurations, such as database configurations, startup configurations, and diagnostics configurations.

Figure 13:
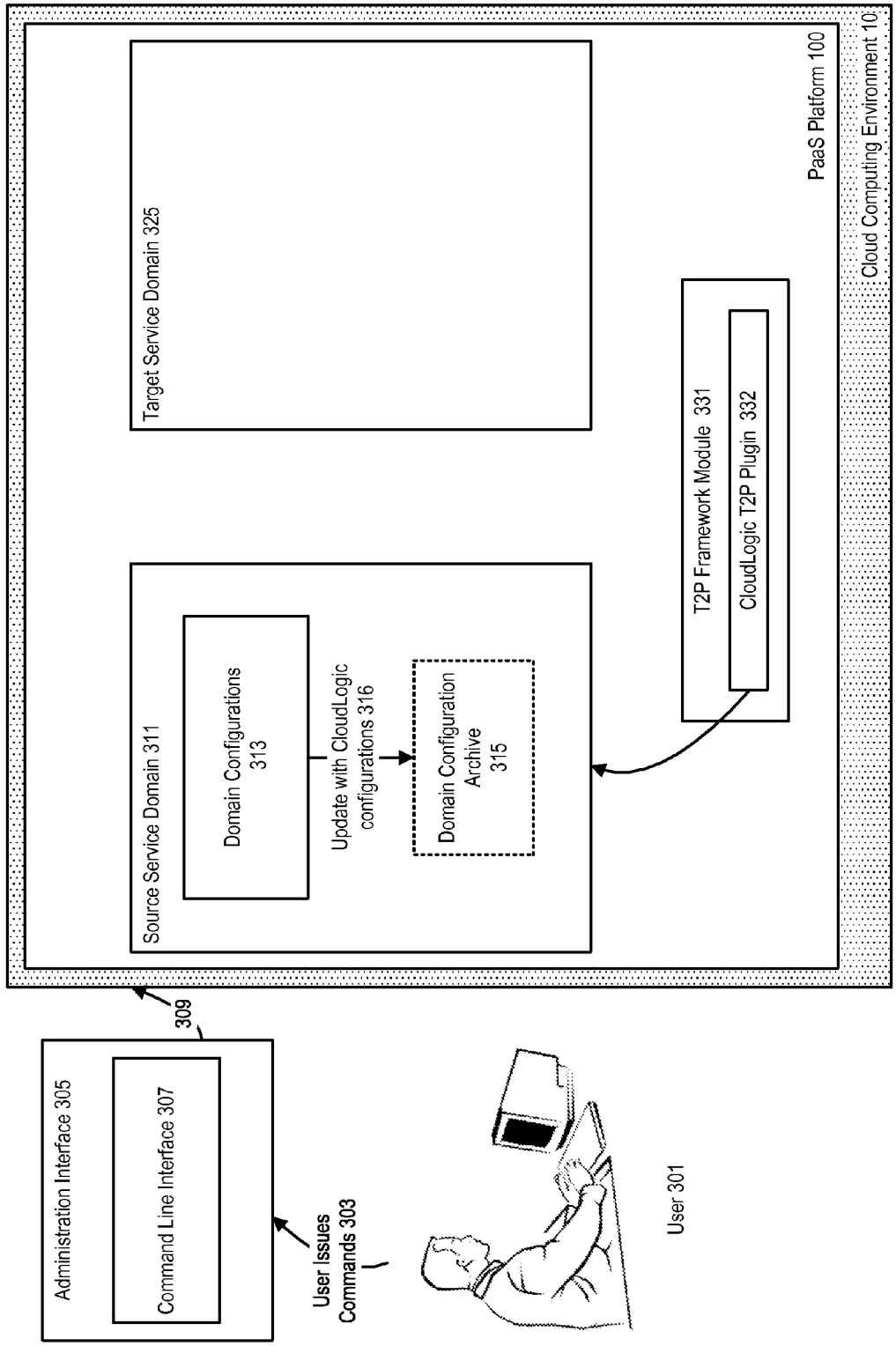
FIG. 13 further illustrates a system for use in migrating domain configurations from a source service domain to a target service domain, in accordance with an embodiment.

FIG. 13 further illustrates a system for use in migrating domain configurations from a source service domain to a target service domain, in accordance with an embodiment. After the domain configuration archive is created, the T2P framework module can invoke the PaaS plugin to update 316 the domain configuration archive with the service domain configurations.

In accordance with an embodiment, the service domain configurations can include a virtualization configuration, an SDP configuration, a service type configuration, a provider type configuration, a service resource type configuration, and a tenant structure configuration, each of which service domain configurations can be associated with a move plan (which can comprise one or more move plan files), and binary files for storing parameters for the move plan.

Figure 14:
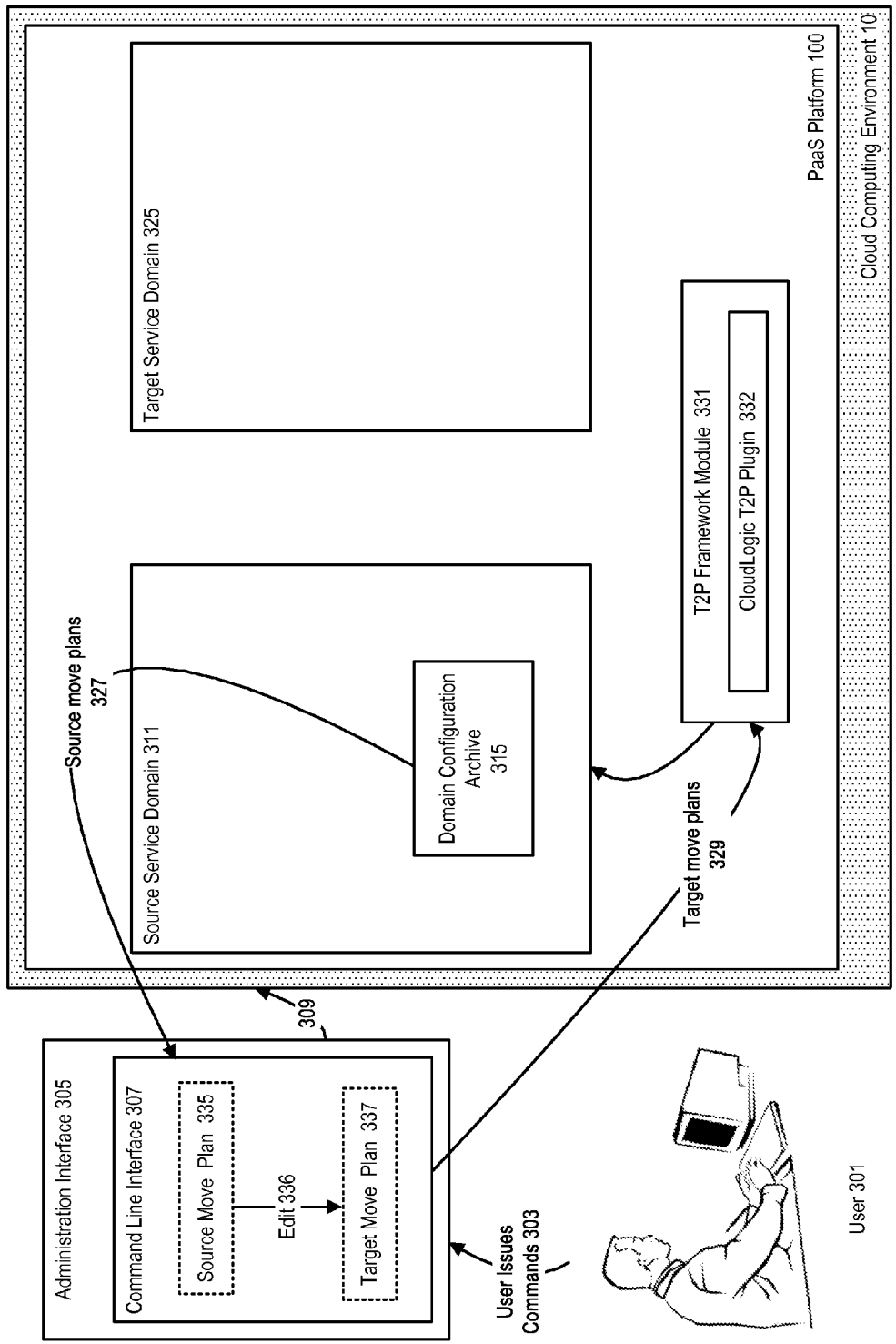
FIG. 14 illustrates a system for use in editing move plans, in accordance with an embodiment.

FIG. 14 illustrates a system for use in editing move plans, in accordance with an embodiment.

As shown in FIG. 14, in accordance with an embodiment, each of the source move plans in the domain configuration archive can be extracted 327, using the T2P framework module, to a user specified location. Each of the extracted source move plan 335 can be retrieved from the specified location, and edited 336 or customized by the user at the command line interface, to generate a corresponding target move plan 337, which can be used 329 by the T2P framework module or the PaaS plugin to recreate the domain configurations in the target service domain.

In accordance with an embodiment, editing or customizing the move plans can include changing various IP addresses, data source end points, and node manager configurations; changing the SDP configuration to point to a location where imported SDP binaries files are stored; changing the provider type configuration to point to a new provider location; and/or changing the virtualization configuration to point to a new OVM/OVAB URL.

In accordance with an embodiment, the move plan customization can be illustrated using, for example, a provider type configuration, as shown in Listings 2 and 3:

---
Listing 2
---

```
<movableComponent>
    <componentType>Cloud</componentType>
```

---
-continued
---

---
Listing 2
---

```
    <componentName>CloudPlatform</componentName>
    <moveDescriptor>
        <configGroup>
            <type>PROVIDER_TYPE</type>
            <configProperty id="ProviderType1">
                <configProperty>
                    <name>Provider Type Name</name>
                    <value>OracleDBProvider</value>
                    <itemMetadata>
                        <dataType>STRING</dataType>
                        <scope>READ_ONLY</scope>
```

Listing 2

```
            </itemMetadata>
        </configProperty>
        <configProperty>
            <name>Configuration Plan</name>
            <value>cloudlogic/oracledbprovider.xml<
            /value>
            <itemMetadata>
                <dataType>STRING</dataType>
                <scope>READ_WRITE</scope>
            </itemMetadata>
        </configProperty>
    </configGroup>
    </moveDescriptor>
</movableComponent>
```

Listing 3

```
<servicetype name="OracleDBProvider" type="PROVIDER_TYPE"
sdpref= OracleDB">
    <st-revision default-revision=" true">
        <property name="connectionAttributes"
        value="create=true"></property>
        <property name="user" value="APP"></property>
        <property name="password" value="APP"></property>
        <property name="portNumber" value="1527"></property>
        <propertyname="databaseName"
        value="sampledb"></property>
        <property name="hostName" value="localhost"></property>
    </st-revision>
</servicetype>
```

As shown in Listing 2, in accordance with an embodiment, the move plan file can include a reference to another move plan file, i.e., a provider type configuration file "cloudlogic/oracledbprovider.xml". The oracledbprovider.xml as shown in Listing 3 can be edited and customized to point to the new provider end point. Move plan files for other configurations can be similarly edited.

Figure 15:
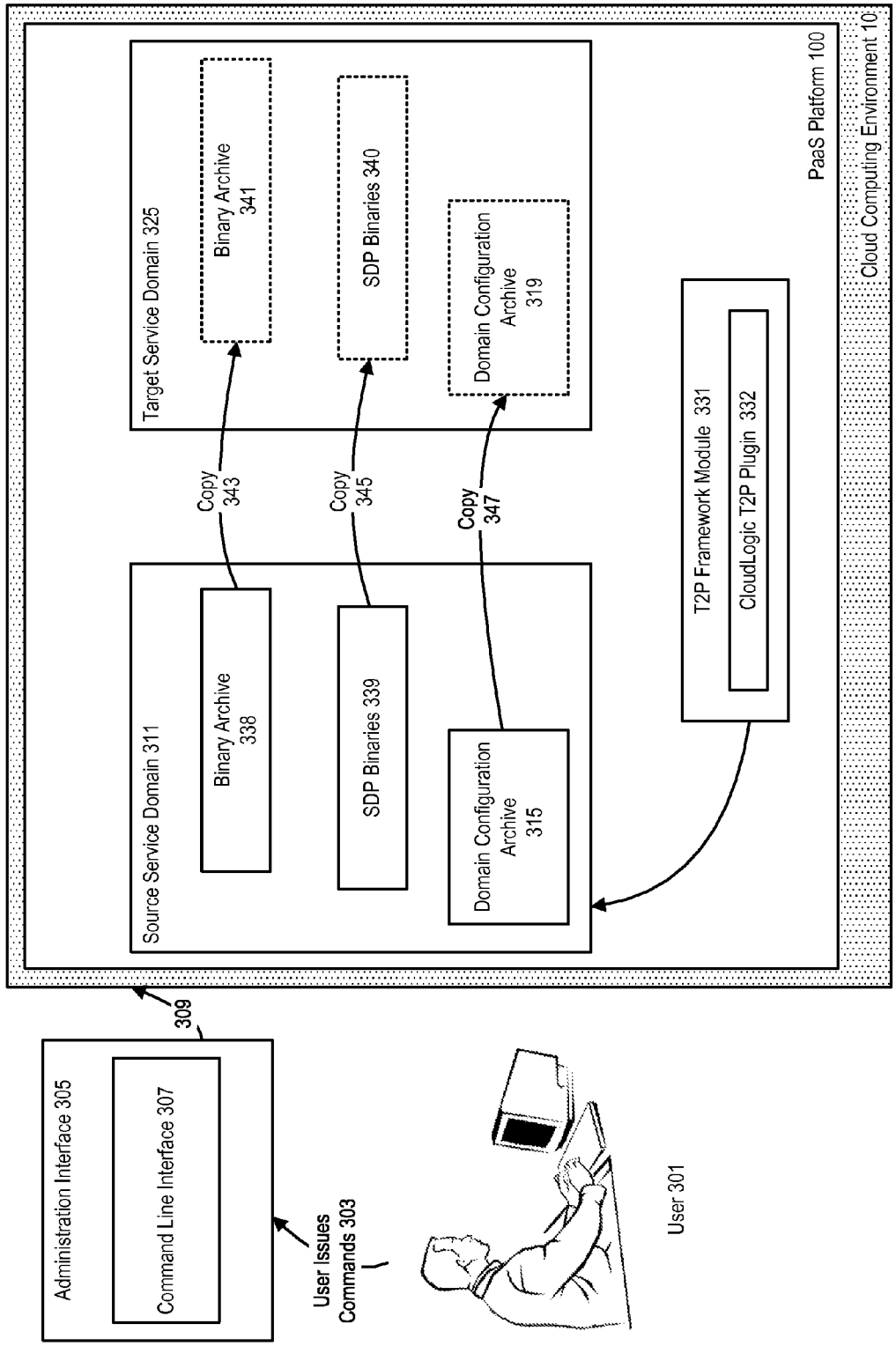
FIG. 15 further illustrates a system for use in migrating domain configurations from a source service domain to a target service domain, in accordance with an embodiment.

FIG. 15 further illustrates a system for use in migrating domain configurations from a source service domain to a target domain, in accordance with an embodiment.

In accordance with an embodiment, to replicate domain configurations, middleware and SDP binaries associated with the domain configurations also need to be replicated. As shown in FIG. 15, in accordance with an embodiment, a source binary archive 338, one or more source SDP binary files 339, and the source domain configuration archive 315 can be copied 343, 345, and 347 to the target service domain as a target binary archive 341, target SDP binaries 340, and a target domain configuration archive 319, either via FTP or other migration tools of the T2P framework module.

In accordance with an embodiment, the source binary archive can be created from an application server installation using a utility of the T2P framework module. As an illustrative example, a script, such as the copyBinary script of the T2P framework module, can be used to prepare the source application server installation and create the binary archive. The script can record the file permissions of the application server installation and the ClouldLogic components in the application server installation.

In accordance with an embodiment, a T2P utility, e.g., pasteBinary.sh, can be used to recreate the middleware from the binary archive in the target service domain, where the T2P utility can check that the prerequisites are met in the target service domain, extract files from the archive file, register middleware and CloudLogic components, and restore the file permissions and relink any files if necessary.

In accordance with an embodiment, the SDP binaries can be copied using, e.g., an export-SDP command, which can convert the SDP binaries into a plurality of smaller ZIP files for easy replication. The SDP binaries, after being copied to the target service domain, can be reloaded and installed, to support service cloning and the recreation of the service domain configurations.

Figure 16:
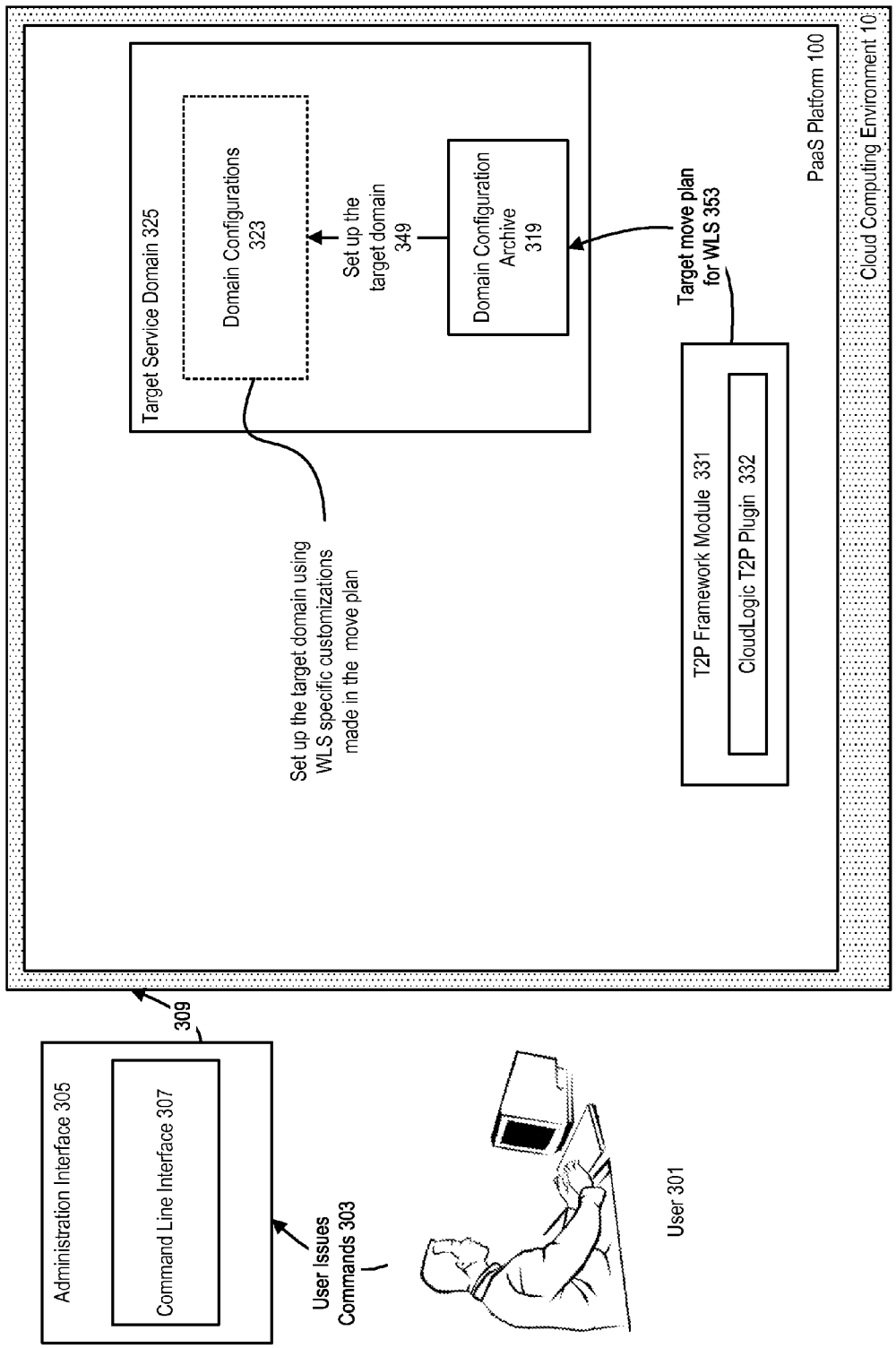
FIG. 16 illustrates setting up a target service domain, in accordance with an embodiment.

FIG. 16 illustrates setting up a target service domain, in accordance with an embodiment. As shown in FIG. 16, in accordance with an embodiment, the T2P framework module can set up the domain 349 with WLS-specific customizations made in the move plan 353. When setting up the target service domain, the WLS configuration can be recreated in a domain configuration file and one or more application servers can be started.

Figure 17:
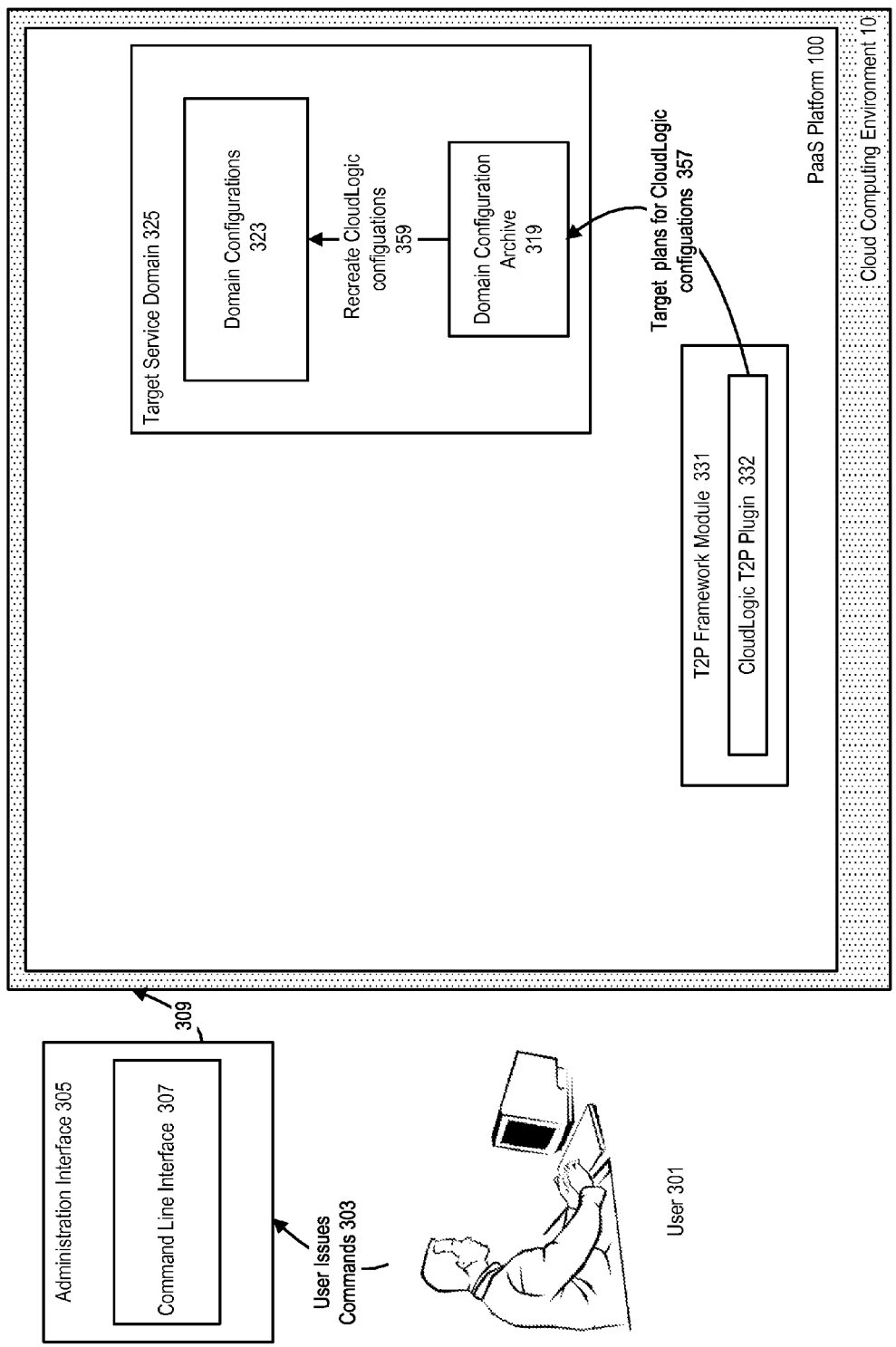
FIG. 17 illustrates recreating domain configurations in a target service domain, in accordance with an embodiment.

FIG. 17 illustrates recreating domain configurations in a target service domain, in accordance with an embodiment.nnAs shown in FIG. 17, in accordance with an embodiment, after the target service domain is set up and started, the T2P framework module can invoke the PaaS plugin to recreate the service domain configurations 359, in accordance with the customizations specified in the move plans.

In accordance with an embodiment, recreating a service domain configuration includes recreating the configuration in a domain configuration file, e.g., domain.xml, and recreating a corresponding directory for storing binary files that contain the file parameters for various revisions of the configuration. When recreating the service type configuration, a validation can be performed to check if the SDP references specified in the service type configuration exist. Once the domain configurations are recreated the target service domain, services can be cloned from the source service domain to the target service domain.

As illustrated above, in accordance with an embodiment, the T2P framework module provides the ability to capture and move the configurations all at once. The complex tasks of setting up the target service domain with the customized WLS configuration and recreating the service domain configurations in the correct order can be handled by the T2P framework module, in conjunction with the PaaS plugin.

Figure 18:
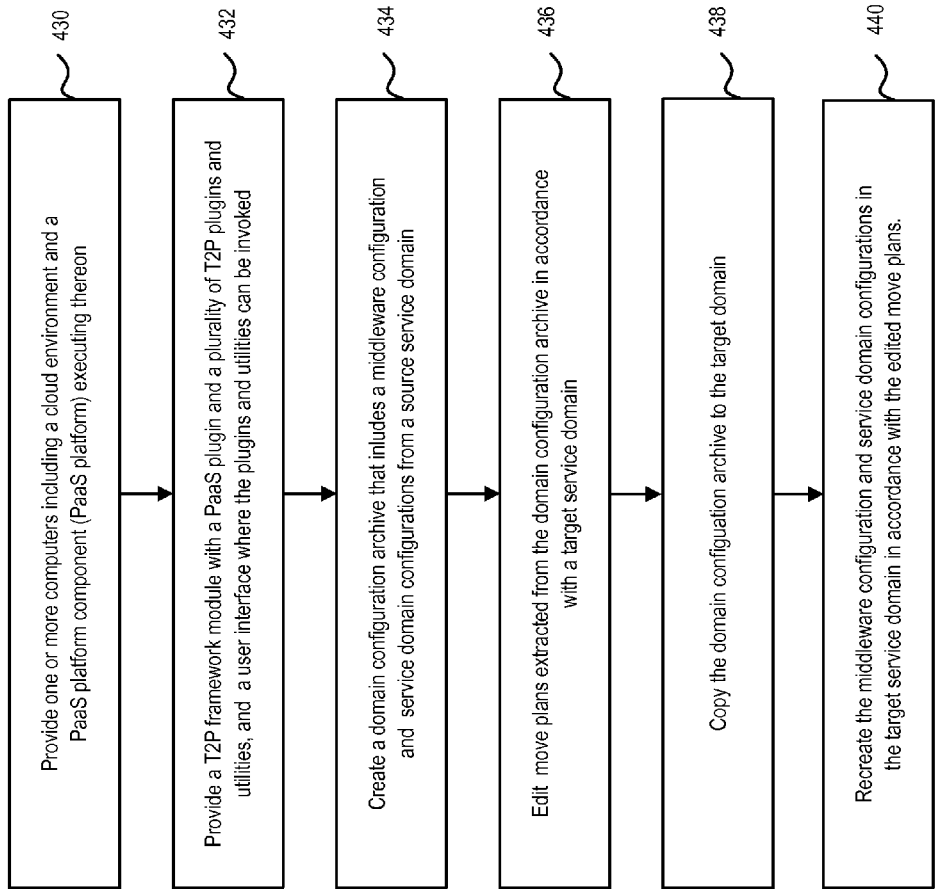
FIG. 18 illustrates a method of replicating a source domain to a target service domain, in accordance with an embodiment.

FIG. 18 illustrates a method of replicating a source service domain to a target service domain, in accordance with an embodiment. As shown in FIG. 18, in accordance with an embodiment, at a first step 430, one or more computers including a cloud environment and a PaaS platform component (PaaS platform) executing thereon, are provided.

At step 432, a T2P framework module with a PaaS plugin and a plurality of T2P plugins and utilities and a user interface where the plugins and utilities can be invoked, are provided.

At step 434, a domain configuration archive that includes a middleware configuration and service domain configurations from a source service domain can be created. When it is first created, the domain configuration archive can include the middleware configuration, and can be subsequently updated with the service domain configurations.

At step 436, the move plan of each configuration in the domain configuration archive is extracted and edited with customizations in accordance with a target service domain.

At step 438, the domain configuration archive is copied to the target service domain.

At step 440, the configurations in the domain configuration archive are recreated in the target service domain in accordance with the customized move plans.

Service Import/Export

In accordance with an embodiment, described herein is a system and method for exporting and importing a PaaS service and associated configurations across service domains are provided. The system comprises a cloud platform component provided as an installable software suite within a cloud environment; a test to production (T2P) framework module that includes a PaaS plugin and a plurality of T2P plugins and tools; and a user interface where the plugins and tools can be invoked to export domain configurations from a source service domain, and import the domain configurations to a target domain. In accordance with an embodiment, the system further includes a service provider interface (SPI) that can be implemented by an SME of each service housed in a service domain, to provide service backup and restore functionalities for exporting and importing that service.

In accordance with an embodiment, the system further includes a service provider interface (SPI) that can be implemented by an SME of each service housed in a service domain, to provide service backup and restore functionalities for exporting and importing that service. Post-provision changes from a source service in a source service domain can be extracted to create a service backup file, which can be exported to a target service domain and applied to a target service created from a same SDP used for creating the source service.

In accordance with an embodiment, domain configurations, e.g., a WLS configuration and a plurality of service domain configurations, can be replicated across service domains to support service exporting and importing. The domain configurations can be extracted from the source service domain, and stored in a domain configuration archive, wherein a move plan for the WLS configuration references each of the move plans for the service domain configurations. The domain configuration archive can be exported to the target service domain, and each configuration is extracted from the domain configuration archive and recreated in the target service domain.

Export from a Source Service Domain

Figure 19:
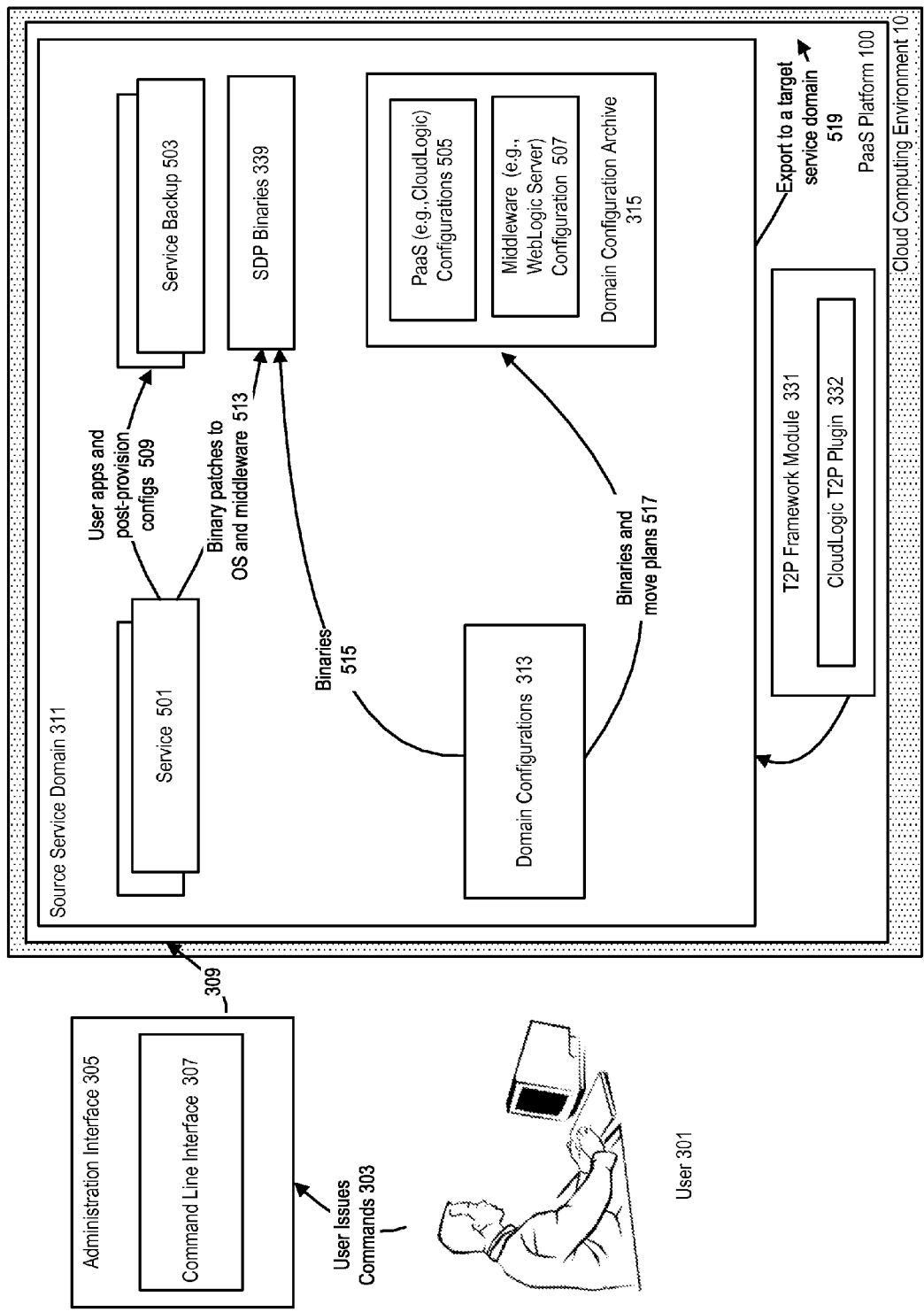
FIG. 19 illustrates a system for use in exporting a service from a source service domain to a target service domain, in accordance with an embodiment.

FIG. 19 illustrates a system for use in exporting a service from a source service domain to a target service domain, in accordance with an embodiment.

As shown in FIG. 19, in accordance with an embodiment, the system comprises a cloud platform component (e.g., a PaaS platform 100) provided as an installable software suite within the cloud environment 10; a T2P framework module 331 that includes a PaaS plugin 332 and a plurality of T2P plugins and tools; and a command line interface 307 within an administration interface 305, wherein a user 301 can issue commands 303 to be executed at the interfaces, to interact 309 with a source service domain 311.

In accordance with an embodiment, a service 501 can include a service application, e.g., Fusion Middleware application, one or more user applications deployed to the service application and associated configurations. Post-provision changes made to the service, such as the user applications and post-provision configurations 509, can be extracted from the service and saved to a service backup file 503. In accordance with an embodiment, the service backup file can be created using the service's SME.

In accordance with an embodiment, the SME can utilize the T2P plugins to extract the post-provision changes from the service, and use the service backup functionality inherited from the SPI to save the changes to the backup file. An example backup interface of the SPI is illustrated by Listing 4:

Listing 4

```
Package com.oracle.cloudlogic.service.spi;
import com.oracle.cloudlogic.service.api.Service;
import com.oracle.cloudlogic.service.api.ServiceBackup;
@org.jvnet.hk2.annotations.Contract
public interface ServiceBackupManager {
    /**
     * Take the backup of the service.
     * @param service The service whose backup needs to be taken.
     * @return The service backup.
     */
    ServiceBackup backup (Service service);
    /**
     * Restore the backed up data to the service.
     * @param service Service to which the backup needs to be applied.
     * @param backup The service backup
     * @return true if successful, false otherwise.
     */
    boolean restore (Service service, ServiceBackup backup);
    // Other existing methods
}
package com.oracle.cloudlogic.service.api;
@org.jvnet.hk2.annotations.Contract
public class ServiceBackup implements Serializable {
    // Name of the service for which this backup was taken.
    private String serviceName;
    // Time at which the backup was taken
    private Date timestamp;
    //Service name and timestamp together form a unique backup id.
    // Backup description
      String description;
private Map<String, File> backupFiles = new HashMap( );
public ServiceBackup (String serviceName, Date timestamp, String description) {
        this.serviceName = serviceName;
        this.timestamp = timestamp;
        this.description = description;
    }
    public String getServiceName( ) {
        return serviceName;
    }
    public Date getTimestamp( ) {
        Return timestamp;
    }
    public Map <String, File> getBackupFiles( ) {
        this.backupFiles = backupFiles;
    }
    public void addBackupFile (String name, File file) {
        backupFiles.put (name, file);
    }
}
```

As shown in Listing 4, in accordance with an embodiment, the SPI interface can store information about a service, such as the name, timestamp, and a description of the service. User applications and post-provision configurations can be stored in a data structure, e.g., a Map, for easy retrieval of the information after the backup file is transferred to a target service domain.

As further shown in FIG. 19, the service can be associated with operating system and middleware patches made after the service is provisioned. Binary patches 513 can be saved to binary files 339 of an SDP used for creating the service.

In accordance with an embodiment, a WLS plugin of the T2P framework module can be used to create a domain configuration archive file 315, to contain information extracted from domain configurations 313. Domain configurations can include one or more configuration files, e.g., doman.xml, and one or more binary files, e.g., for holding file parameters for the configuration files. Each of the plurality of domain configurations, such as a service type configuration and a WLS-related configuration, can have one or more corresponding segments in the domain configuration files. These segments can define customizable parameters for a cross-domain migration, and can be extracted out as move plan files.

In accordance with an embodiment, the domain configuration archive 315 can be created to initially include a middleware (e.g., WLS) related configuration 507, and subsequently updated with service domain configurations 505. The creation and updating of the domain configuration archive can be performed respectively by the T2P framework module and the PaaS plugin. In accordance with an embodiment, a command, e.g., copyConfig.sh, can be executed at the command line interface to sequentially invoke the framework module and the PaaS plugin.

In accordance with an embodiment, the domain configuration archive can include both move plans and associated binary files 517 for the configurations with the exception of the SDP configuration. Sizes of the binary files associated with the SDP configuration can be very large and can be extracted 515 and stored in a separate SDP binary file 339, instead of the domain configuration archive. The move plan for the SDP configuration can be stored in the domain configuration archive.

into a ZIP file. The ZIP files can be added to the configuration archive under a directory, and a move plan 527 can be extracted from the ZIP files and stored in a separate directory 505 in the domain configuration archive. The binary files 526 for the service type configuration 525, which can include different revisions to the service type, can be extracted 541 from the domain configurations.

Figure 20:
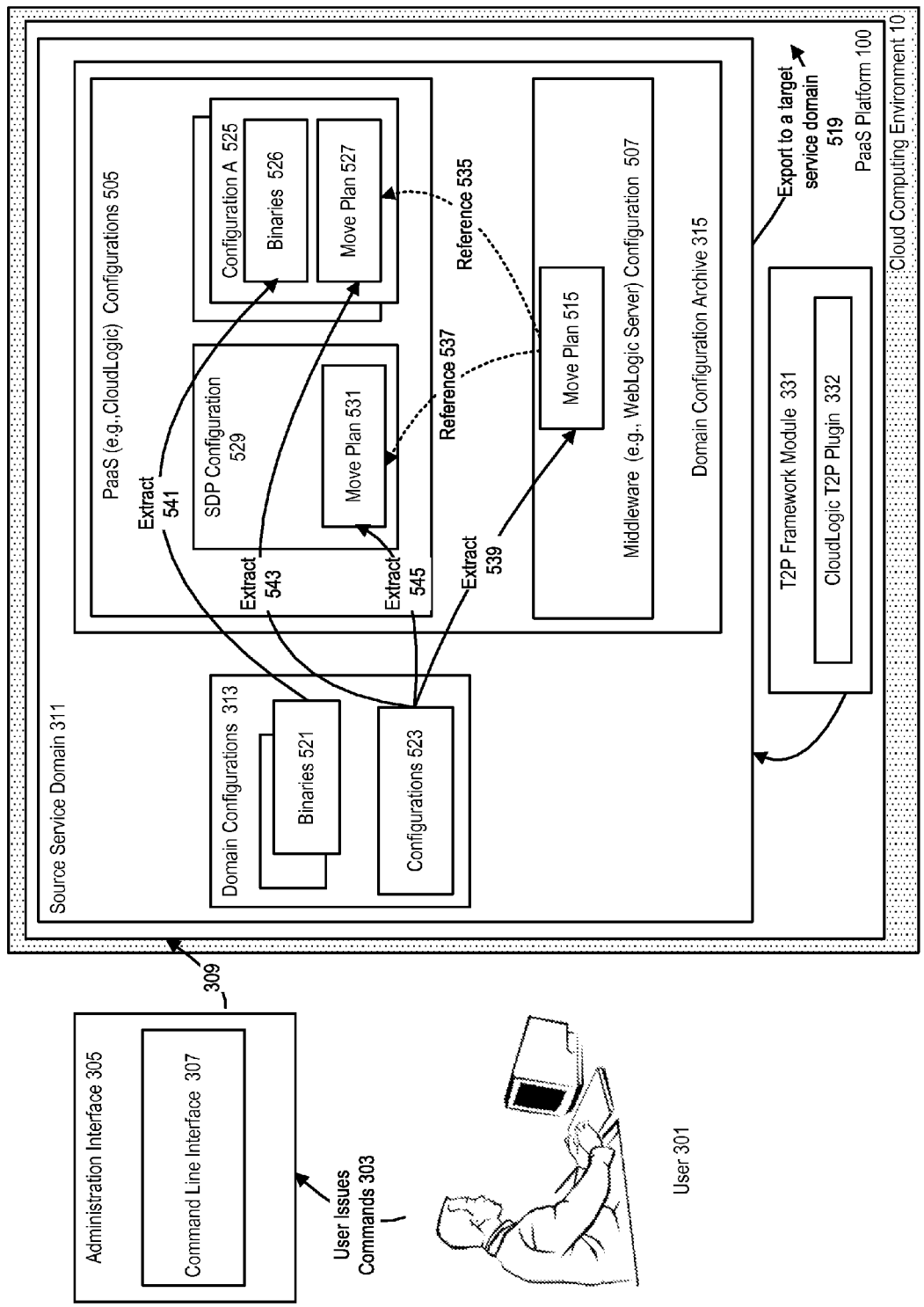
FIG. 20 illustrates a system for creating a domain configuration archive for use in exporting a service from a source service domain to a target service domain, in accordance with an embodiment.

As further shown in FIG. 20, in accordance with an embodiment, the SDP configuration 529 in the domain configuration archive only includes a move plan 531, and does not include associated binary files. Because of the large size of the binary files associated with the SDP, which can include service-definition.xml, file parameter binaries, SME JAR and its revisions, and virtual assemblies, the SDP binaries can be exported to the target service domain separately. Once the move plans for the service domain configurations are stored in the domain configuration archive, the move plan of the middleware configuration can be updated to reference 535, 537 each of the service domain configuration move plans.

An example updated domain configuration archive structure is illustrated in Listing 5 below:

Listing 5

```
META-TNF/MANTFEST.MF
CLONE20130717174007748_CLONE_ALL_SRCTD_MAP_FTLE_1374108008035
clientjar/cloningclient.jar
CLONExxx-J2EECOMPONENT@myCloudDomain/REPOSITORY/
packed_domain.jar
CLONExxx-J2EECOMPONENT@myCloudDomain/REPOSTTORY/configplans/
moveplan.xml
CLONExxx-J2EECOMPONENT@myCloudDomain/REPOSTTORY/configplans/
deployment_plans/**.xml
CLONExxx-J2EECOMPONENT@myCloudDomain/REPOSTTORY/ldapdata/**.dat
CLONExxx-J2EECOMPONENT@myCloudDomain/REPOSTTORY/configplans/
cloudlogic/**.xml
CLONExxx-J2EECOMPONENT@myCloudDomain/REPOSTTORY/cloudlogic/
<<binary files>>
```

In accordance with an embodiment, a service backup file, the domain configuration archive and the SDP binary files can exported 519, e.g., by FTP, to a target service domain.

FIG. 20 illustrates a system for creating a domain configuration archive for use in exporting a service from a source service domain to a target service domain, in accordance with an embodiment.

As shown in FIG. 20, the domain configurations can include domain configuration files 523, and binary files 521 for providing file parameters for the configuration files.

In accordance with an embodiment, when creating the domain configuration archive, the T2P framework module can extract 539 the move plan 515 for the middleware configuration 507 from the domain configuration files, and store the move plan in the domain configuration archive. Similarly, move plans for the service domain configurations can be extracted 543, 545 and stored in the configuration archive. When extracting a configuration from the domain configuration files, the system can convert that configuration into one or more ZIP files, add the ZIP files to the domain configuration archive, extract the move plan from the ZIP files, and store the move plan in the domain configuration archive.

As an illustrative example, in accordance with an embodiment, the PaaS plugin can invoke a T2P utility, e.g., list-service-types, to display the service types to be exported; and for each displayed service type, invoke another T2P utility, e.g., export-service-type, to convert the service type As shown in Listing 5, in accordance with an embodiment, binary files and move plans for the service domain configurations can be stored in two separate directories. As further shown in Listing 5, the move plan of the middleware configuration is located in a different directory from the move plans of the service domain configurations.

In accordance with an embodiment, the packed_domain.jar in Listing 5 can have the structure as shown in Listing 6:

Listing 6

```
config/
config/config.xml
config/cloudserver/..
config/coherence/..
config/diagnostics/..
config/jdbc/..
common/db/..
config/deployments/..
config/fmwconfig/..
config/startup/..
..other xml files like database.xml, security.xml,
confignodemanager.xml,..etc..
consoleext/..
ab_instance/..
```

Import to a Target Service Domain

Figure 21:
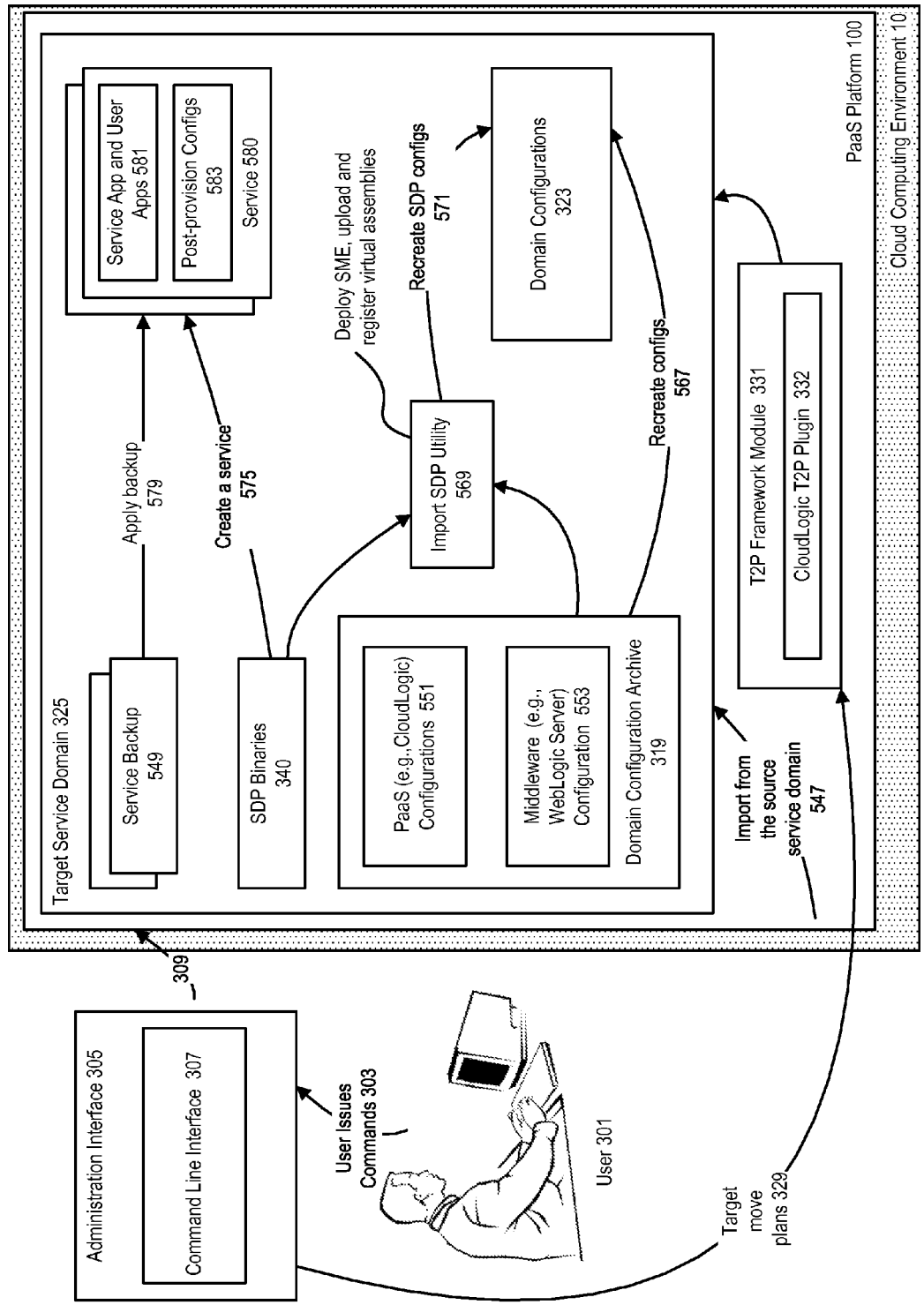
FIG. 21 illustrates a system for use in importing a service to a target service domain, in accordance with an embodiment.

FIG. 21 illustrates a system for use in importing a service to a target service domain, in accordance with an embodiment.

As shown in FIG. 21, a service backup file 549, SDP binaries 340, and a domain configuration archive 319 including service domain configurations 551 and a middleware configuration 553, have been imported 547 to the target service domain.

In accordance with an embodiment, the T2P framework module can be invoked to set up the target service domain with the WLS specific customizations made in the move plan 329 and using the middleware extracted from the imported binary archive. Once the T2P framework module finishes creating the target service domain, the PaaS plugin can be invoked to recreate 567 the service domain configurations. Recreating a configuration can include creating the configuration and various revision objects in a domain configuration file 323, e.g., domain.xml, and creating a corresponding directory to the associated binary file parameters.

As an illustrative example, in accordance with an embodiment, a service type configuration can be recreated in accordance with the corresponding edited move plan by validating if the SDP references specified in the service type and the SDP revisions corresponding to the service type revisions exists; upon validation, using configuration modularity to recreate the service type and service type revision objects in the domain configuration file; and, creating a service type directory in the target service domain. In accordance with an embodiment, the SDP configurations must have been recreated and the SDP binaries loaded to the target service domain, before the service type configuration can be recreated therein.

In accordance with an embodiment, the SDP configuration can be imported using an import SDP utility 569, which can recreate 571 the SDP configuration and associated revisions in the target service domain, copy the service-definition.xml and associated files to an appropriate directory in the domain, deploy the SME with its revisions from the SDP binaries, and upload and register virtual assemblies from the SDP binaries with the PaaS platform. To import the source service 343, the deployed SME can be invoked to create 575 a new service 580 in accordance with the SDP binaries that has been used to create the source service, and apply the service backup 579 imported from the source service domain to the new service. The updated new service can include a service application and user applications 581, and post-provision configurations 583.

Figure 22:
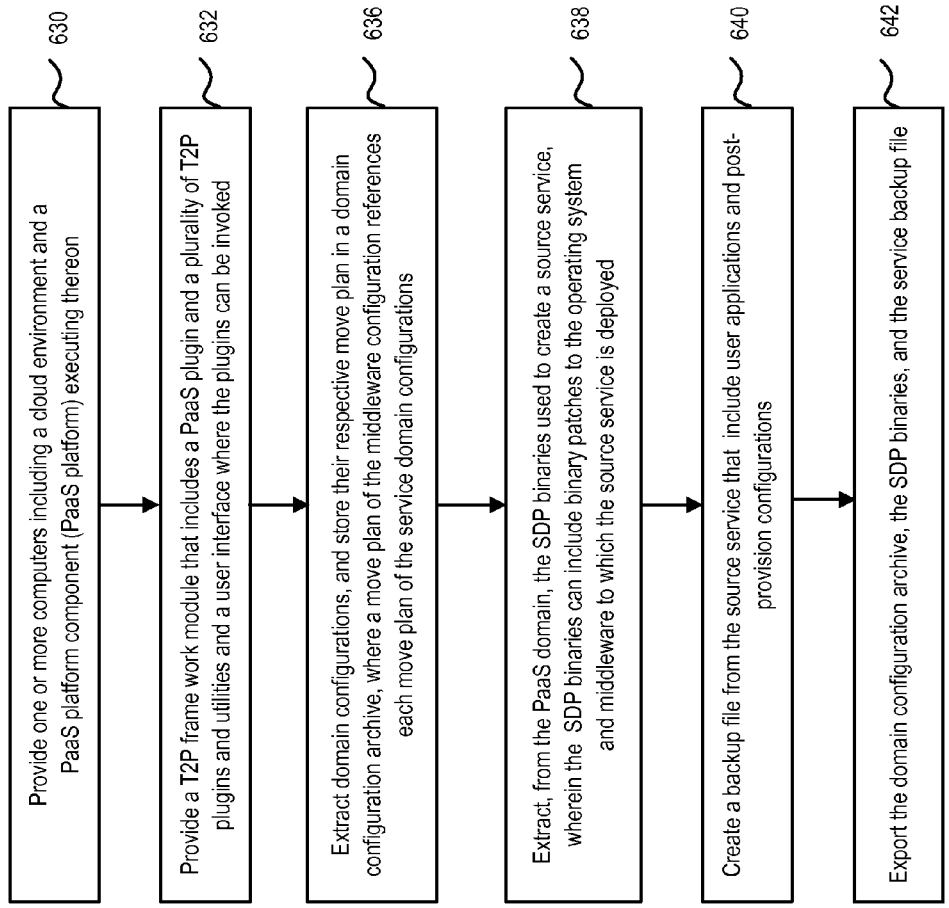
FIG. 22 illustrates a method of exporting a service from a source to a target service domain, in accordance with an embodiment.

FIG. 22 illustrates a method of exporting a service from a source service domain to a target service domain, in accordance with an embodiment. As shown in FIG. 22, in accordance with an embodiment, at step 630, one or more computers including a cloud environment and a PaaS platform component executing thereon, are provided.

At step 632, a T2P framework module that includes a PaaS plugin and a plurality of T2P plugins and utilities and a user interface where the plugins can be invoked, are provided.

At step 636, the domain configurations can be extracted using the plurality of plugins and utilities from the source service domain and stored in a domain configuration archive, where a move plan of the middleware configuration references each move plan of the other domain configurations.

At step 638, the SDP binaries used to create a source service is extracted from the source service domain, wherein the SDP binaries can include binary patches to the operating system and middleware to which the source service is deployed.

At step 640, a backup of the source service that includes user applications and post-provision configurations to the service is created using the SME of the source service.

At step 642, the domain configuration archive, SDP binaries, and service backup file are exported.

Figure 23:
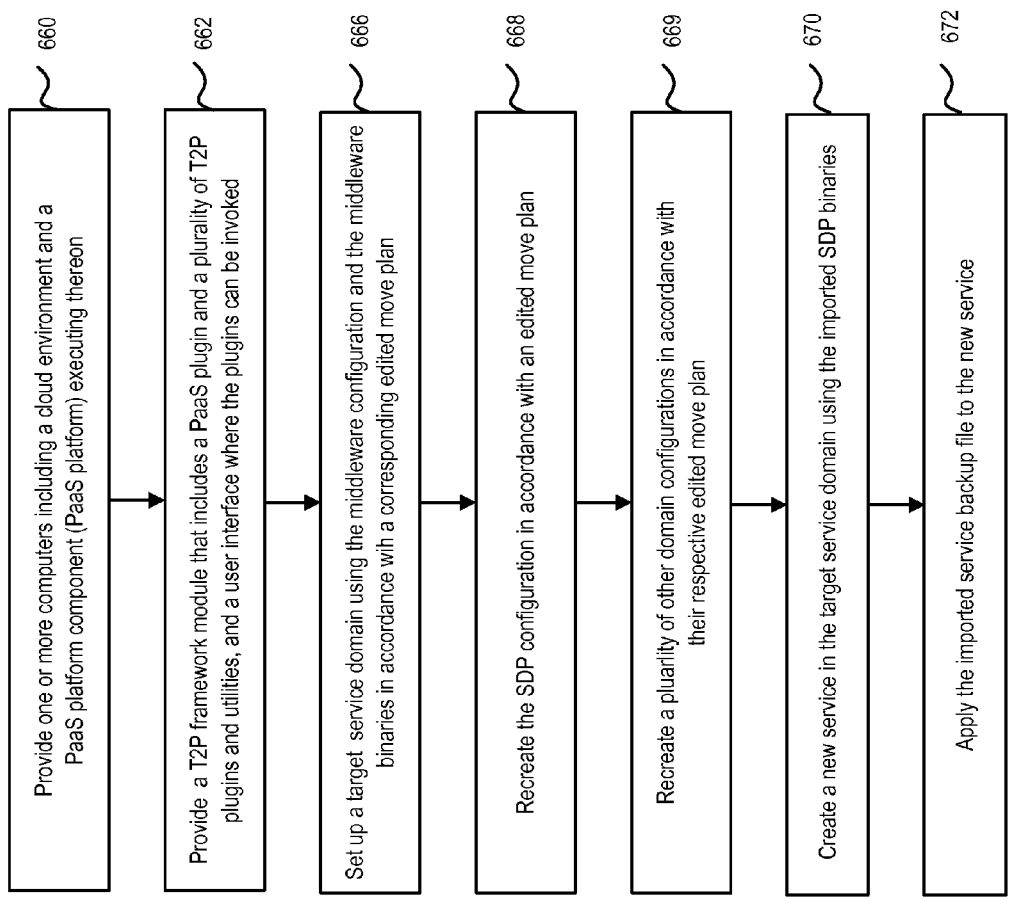
FIG. 23 illustrates a method of importing a service to a target service domain, in accordance with an embodiment.

FIG. 23 illustrates a method of importing a service to a target service domain, in accordance with an embodiment. As shown in FIG. 23, in accordance with an embodiment, at step 660, one or more computers including a cloud environment and a PaaS platform component executing thereon, are provided.

At step 662, a T2P framework module that includes a PaaS plugin and a plurality of T2P plugins and utilities and a user interface where the plugins can be invoked, are provided.

At step 666, a target service domain is set up using the middleware configuration and the middleware binaries in accordance with a corresponding edited move plan.

At step 668, the SDP configuration is recreated in accordance with a corresponding edited move plan, including recreating the SDP configuration and associated revisions in a domain configuration file, deploying the SME with its revisions, and uploading and registering virtual assemblies with the target service domain.

At step 669, a plurality of other service domain configurations are created in accordance with their respective edited move plan.

At step 670, a new service is created in the target service domain using the imported SDP binaries.

At step 672, the imported service backup file is applied to the new service.

Service Cloning

In accordance with an embodiment, described herein is a system and method for providing a clone a service in a cloud platform environment. The system can clone a source service within a service domain or across service domains, by creating a new service from a same service definition package used for creating the source service, extracting post-provision changes from the source service, e.g., user applications and post-provision configurations, and applying the changes to the new service.

In accordance with an embodiment, the system provides a generic and extensible solution to service cloning, and can be used to clone any PaaS service, e.g., Database service, Java EE service and SOA service, if the supplier of such a service implements a plugin (i.e. a service management engine) using a service provider interface (SPI). The SME of each service in a service domain can implement the SPI to provide service backup and restore functionalities when a service is being cloned, and is provided with complete control in determining changes that have been made to the source service, and in choosing the changes that need to be replicated to a target service.

Furthermore, in accordance with an embodiment, the system can provide automatic re-wiring of infrastructure and application dependencies while cloning a service. By way of illustration, a WebLogic service, which is associated with a test database in a test environment, can be automatically switched to a production database when cloned to a production environment. As such, under the above-described approach, a service cloning operation can be highly automatable and require minimal manual intervention.

In accordance with an embodiment, the above-described approach can be used to create a clone service within a same domain, where the clone service can run on the same virtualization configuration and use the same provider types as the source service, or run on a different virtualization pool and use different provider types for various provider dependencies from the source service. Alternatively, a source service can be cloned from a source service domain to a target service domain when the SDP, service types and provider types have been imported from the source service domain to the target service domain.

In accordance with an embodiment, the service cloning feature provides a means of moving a tested/tuned service into production, ensures consistency of configurations of services in a large enterprise, and helps the account administrator prevent "configuration sprawl".

Figure 24:
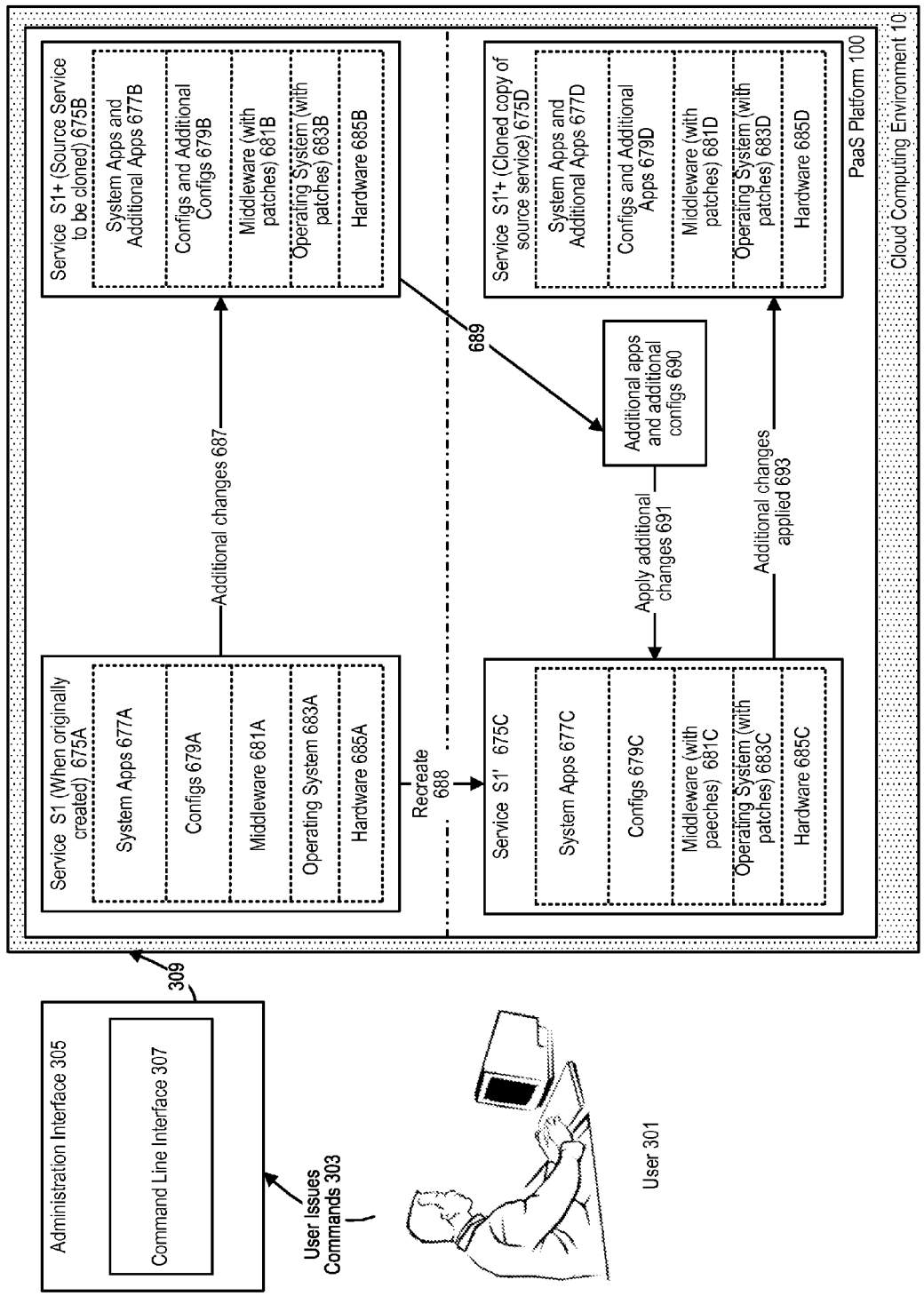
FIG. 24 illustrates a high level overview of cloning a service within a PaaS platform, in accordance with an embodiment.

FIG. 24 illustrates a high level overview of cloning a service within a PaaS platform, in accordance with an embodiment.

As shown in FIG. 24, in accordance with an embodiment, a cloud platform component (e.g., a PaaS platform 100) can be provided as an installable software suite within a cloud environment 10. A command line interface 307 within an administration interface 305 can be used by a user 301 to issue a service cloning command 303 to interact 309 with the PaaS platform.

In accordance with an embodiment, a source service 675A, when originally created, can include system applications 677A and configurations 679A, and can be deployed to a middleware application 681A, e.g., a WebLogic server. The middleware application can be further deployed on an operating system 683A executing on a hardware system 685A.

In accordance with an embodiment, additional changes 687 can be made to the provisioned service, where the additional changes can include user applications, additional configurations, tuning, performance optimizations, patches to the operating system and the middleware.

For example, service S1+ (e.g., 675B) illustrates the originally created service to which the post-provision changes have been applied. The service S1+ can include the additional changes 677B, configurations and additional configurations 679B, where these applications and configurations are deployed to a middleware application 681B executing on an operating system 683B, and where the operating system is installed on a hardware system 685B. The service S1+, with the additional changes, can be a source service to be cloned.

As a first step in cloning the source service, the user can issue a service cloning command through the commandline interface to recreate 688 a service 675C with the SDP used to create the original service (i.e. Service S1). In accordance with an embodiment, the SDP can carry the binary patches that have been applied to the source service to be cloned (i.e. S1+). Accordingly, the service recreated (i.e. S1') can include the patches, as shown by 681C and 683C. System applications 677C and configurations 679C, which are deployed to the recreated service provisioned on a hardware system 685C, can be the same as those deployed to the service as originally created (i.e. S1).

In accordance with an embodiment, the user can extract 689 the additional applications and configurations from the source service to a storage 690, e.g., a file, and apply 691 the modifications/changes to the recreated service S1'. With the additional changes applied, the recreated service can be considered a cloned copy 675D of the source service. The cloned copy can include the same applications, configurations and patches as the source service, as shown by 677D, 679D, 681D, 683D, and 685D.

Figure 25:
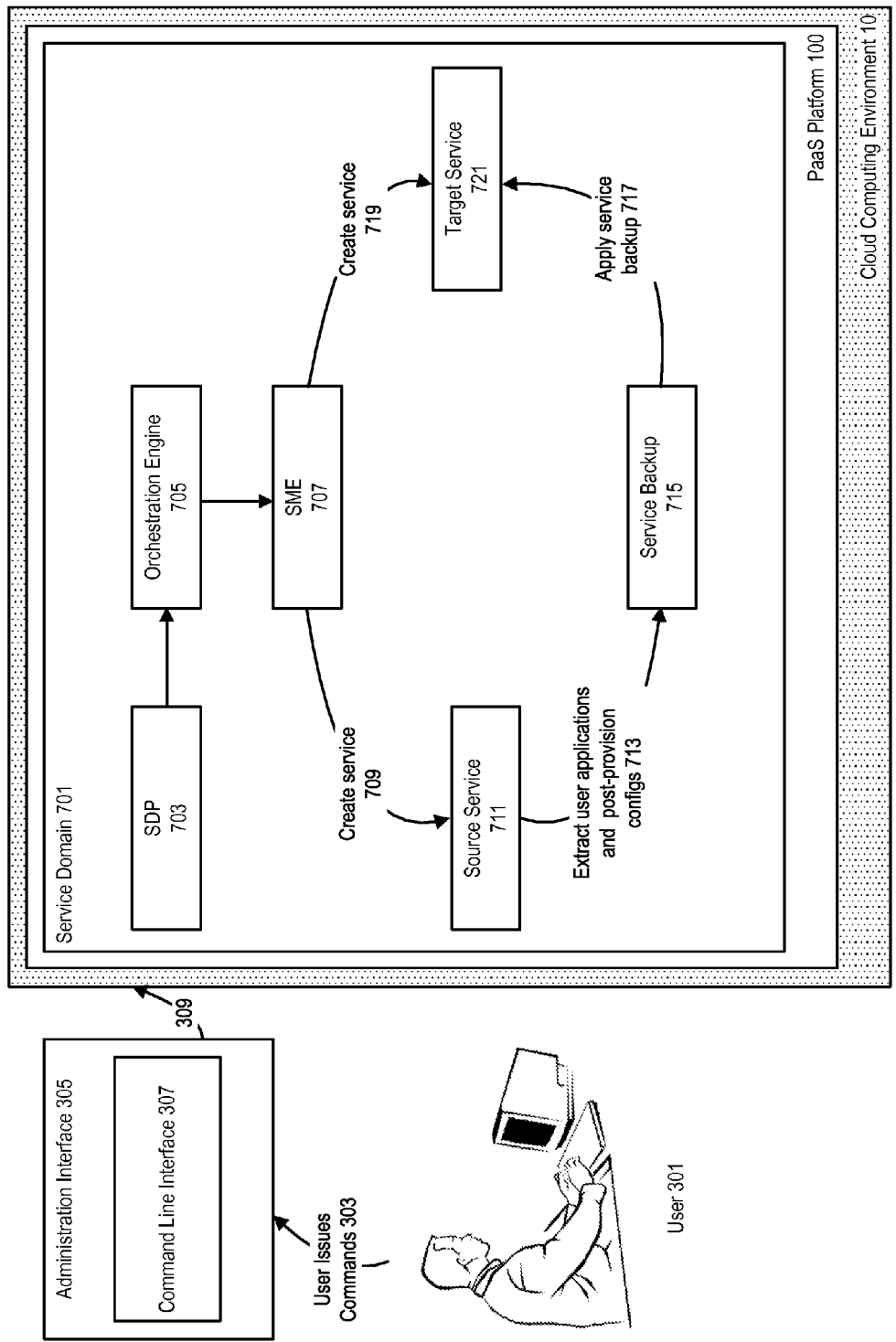
FIG. 25 illustrates a system for use in providing a clone service within a service domain, in accordance with an embodiment.

FIG. 25 illustrates a system for use in providing a clone service within a service domain, in accordance with an embodiment.

As shown in FIG. 25, in accordance with an embodiment, the system comprises the cloud platform component, an SDP 703, an associated SME 707 that has implemented the SPI, and a service orchestration engine (OE) 705 that can invoke the SME to create services based on the SDP.

In accordance with an embodiment, the command line interface within the administration interface can be used by the user to issue the service cloning command to interact with a service domain 701.

In accordance with an embodiment, the service cloning command can specify a source service 711 to be cloned, wherein the source service has been created 709 from the SDP. In accordance with an embodiment, the source service can include a service application, user applications, and service configurations. Service configurations can include post-provision configurations such as JVM options, in addition to e.g., virtualization configurations and provider type configurations for various provider dependencies. The source service can contain binary patches to the middleware and the operating system on which the source service runs.

In accordance with an embodiment, the orchestration engine can invoke the SME to create a service backup 715, using the extracted user applications and post-provision configurations 713 from the source service, create 719 a target service 721 using the same SDP that has been used to create the source service, and apply the service backup 717 to the newly created target service. After the service backup has been applied to the target service, the target service can be considered a clone of the source service.

In accordance with an embodiment, the user interface can expose one or more service types to be selected by the user to clone the source service. When a request is received to clone the source service using a specified service type, the system can check whether the specified service type is a clone of the service type for the source service. If the specified service type fails the check, the service cloning command can terminate. Using a cloned service type to create a target service can enable the target service to run on a different virtualization pool and with different provider types for various provider dependencies from the source service.

In accordance with an embodiment, a service type can be cloned within a service domain using a command that specifies a source service type, a target service type, a virtualization configuration and a plurality of dependency types for provider dependencies. The system can validate whether the specified virtualization option is of the same virtualization type as that of the source service type, whether the provider type chosen for each provider dependency belongs to a correct family. If all the validations succeed, the system can call an SDP manager to find the SDP used for creating the source service type, load the SDP to the specified virtualization configuration if it is not already loaded, and create the desired service type from the loaded SDP.

Figure 26:
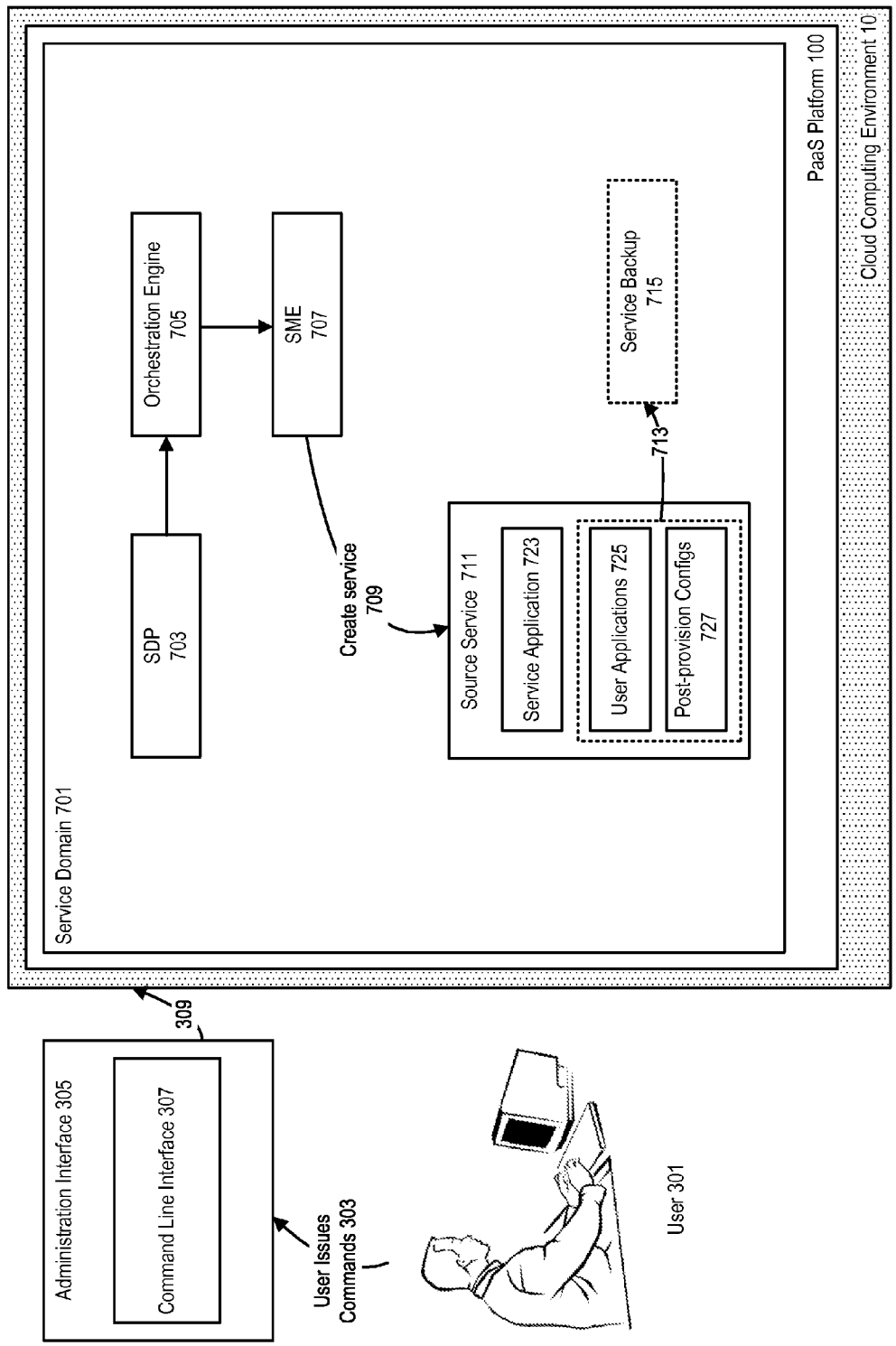
FIG. 26 illustrates creating a service backup within a service domain, in accordance with an embodiment.

FIG. 26 illustrates creating a service backup within a service domain, in accordance with an embodiment.

As shown in FIG. 26, in accordance with an embodiment, the SME can use one or more T2P plugins of the T2P framework module to extract 713 post-provision changes, e.g., user applications 725 and post-provision configurations 727 to the source service, and create a backup file 715 out of the changes. The service backup can include a move plan for the source service but not include a service application 723 of the source service.

In accordance with an embodiment, the SME, by implementing the SPI interface, can compute configuration and application changes that are made to the source service through the administration/configuration tools provided to the user. As an illustrative example, the administrator can change the configurations of a Java service through the service's administration console. If the SME fails during extracting the application and configuration changes, the whole clone-service operation can terminate, and the system can be restored to the state prior to the clone-service initiation.

Figure 27:
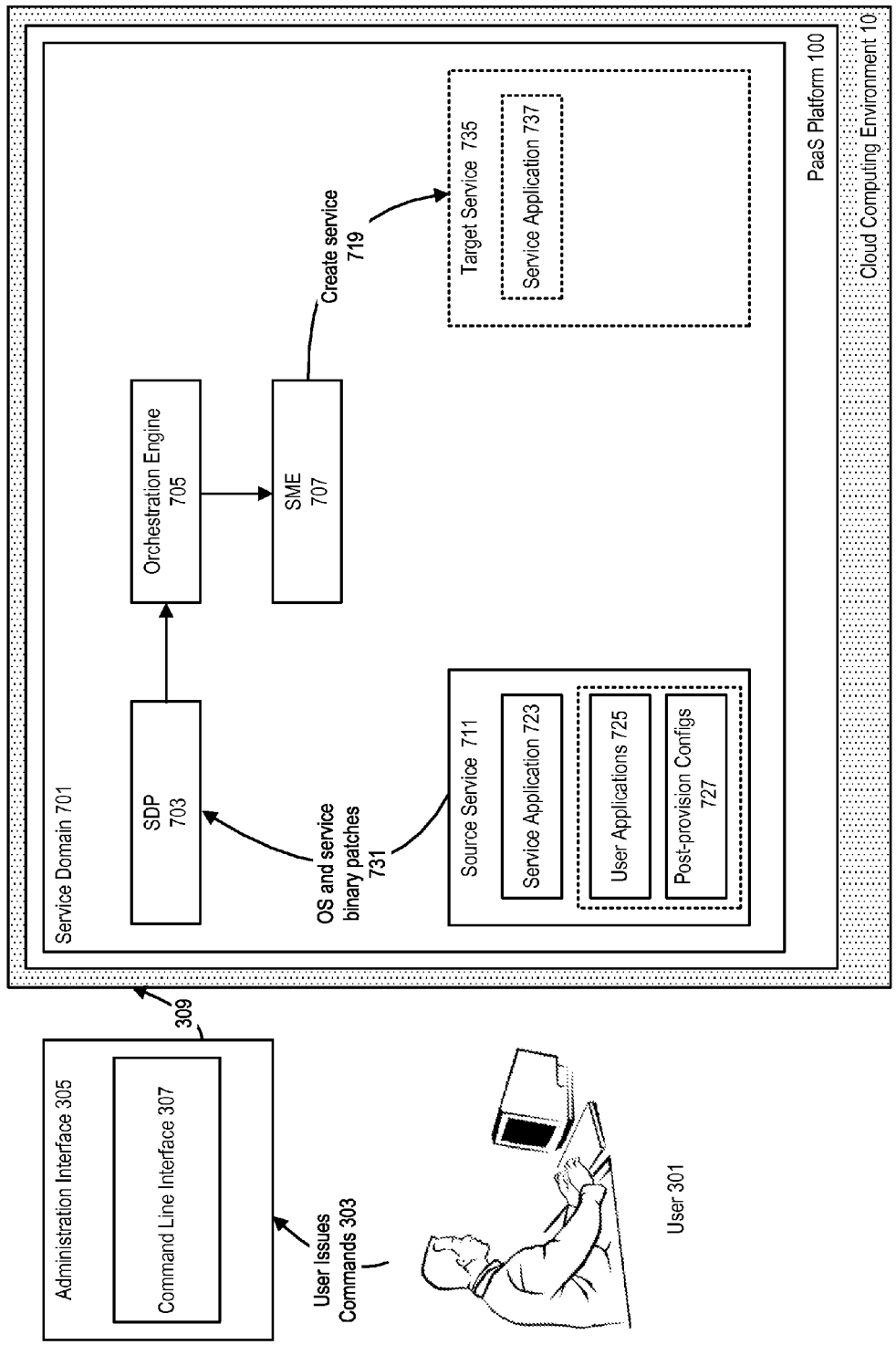
FIG. 27 further illustrates a system for use in providing a clone service within a service domain, in accordance with an embodiment.

FIG. 27 further illustrates a system for use in providing a clone service within a service domain, in accordance with an embodiment.

In accordance with an embodiment, the post-provision changes to the source service can include binary patches 731 to the operating system and the middleware that host the source service. The binary changes can be stored in the SDP binaries used to create the source service. In accordance with an embodiment, the SDP binaries, with the binary patches, can be used to create 719 a target service 735 with a service application 737.

Figure 28:
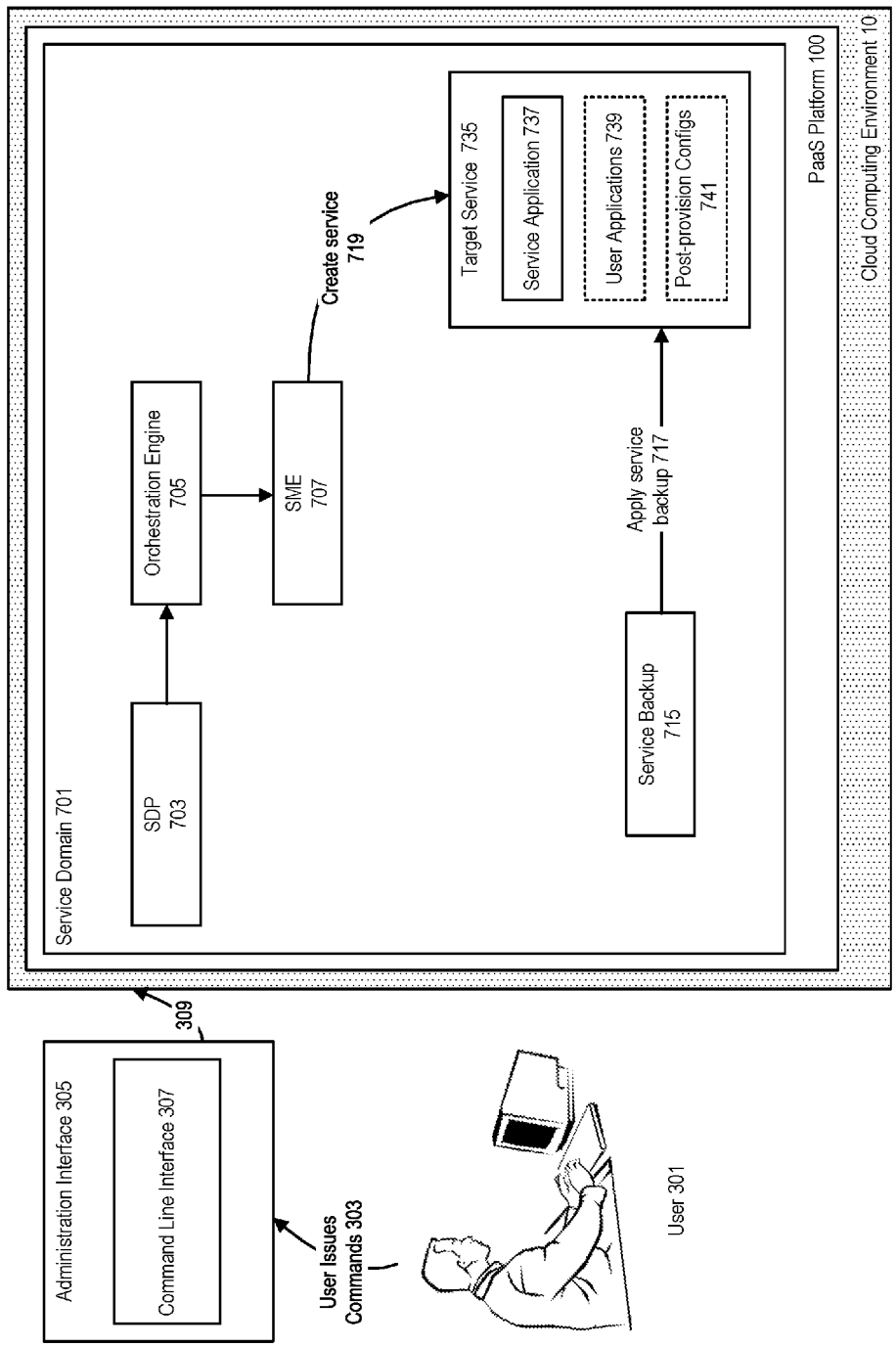
FIG. 28 further illustrates a system for use in providing a clone service within a service domain, in accordance with an embodiment.

FIG. 28 further illustrates a system for use in providing a clone service within a service domain, in accordance with an embodiment.

As shown in FIG. 28, in accordance with an embodiment, the system can invoke the SME to apply the service backup 717 to the target service. Applying the service backup to the target service can include extracting a move plan from the target service using T2P tools; computing the differences between the move plan in the source service backup and the move plan from the target service and merging the two move plans; and applying the source service backup to the target service in accordance with the merged move plan. When merging two move plans, the values of elements with, e.g., READ_WRITE scope in the source service move plan can be changed to reflect the new values required by the target service.

After the service backup is applied, the target service can include user applications 739 and post-provision configurations 741, in addition to the service application and its associated configurations made when the service is provisioned.

In accordance with an embodiment, the SPI implemented by the SME can be defined generically so that it can provide the SME with the flexibility of choosing other approaches for extracting/applying configurations and applications from the source service to the target service without using the T2P tools and utilities. As an illustrative example, the SME can choose the following tools as alternatives:

Service specific tools: For example, the Java Service SME can create a domain extension template and apply the domain extension template to the target service.

OVAB utilities: The SME can use OVAB's disk snapshotting to snapshoot the disk where configurations and application data are stored and apply the configurations and data to the target service. In accordance with an embodiment, snapshotting the service's disk using OVAB can include updating the service's internal configurations in the snapshotted disk by the SME.

Figure 29:
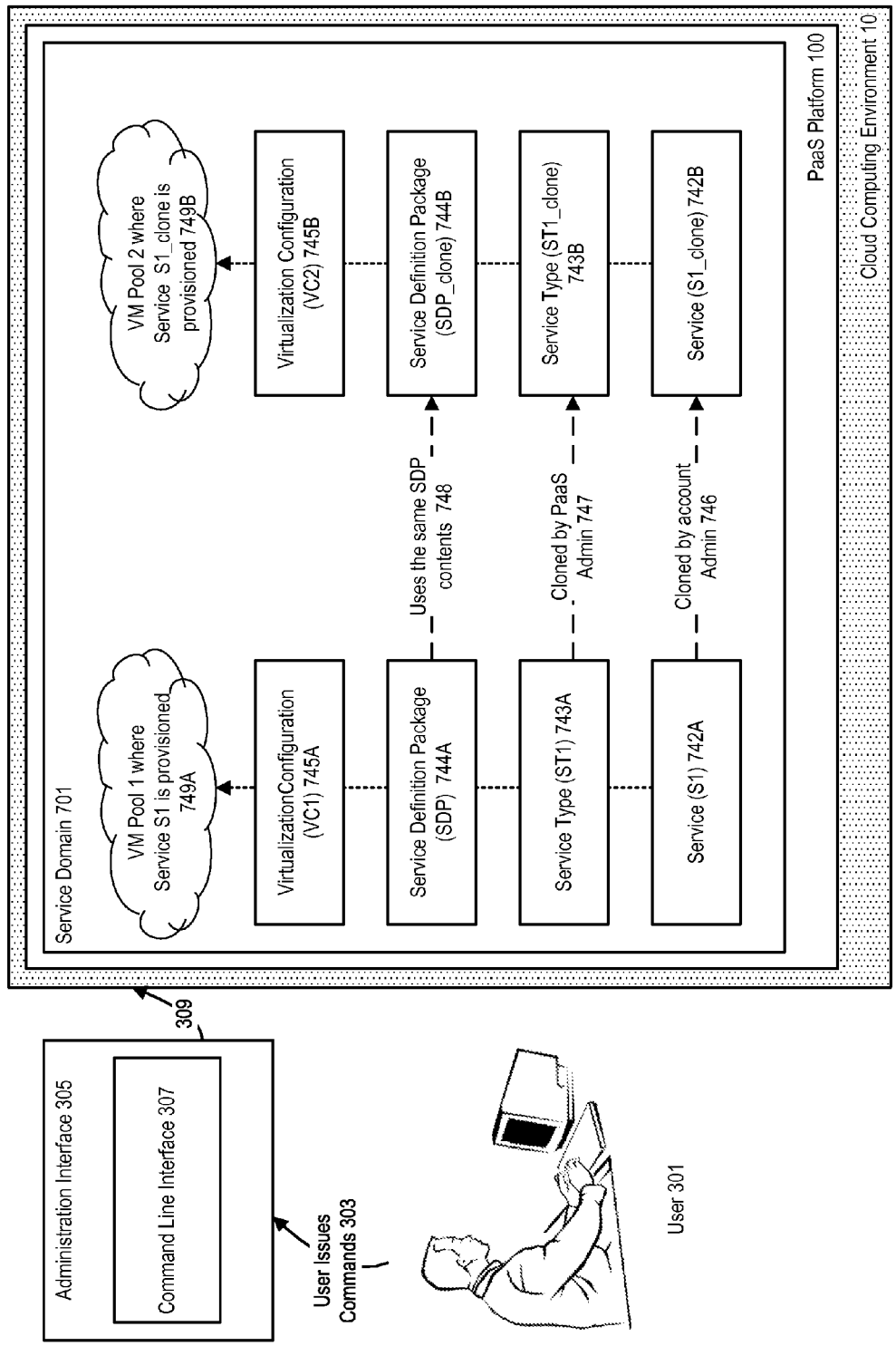
FIG. 29 illustrates cloning a service to run on a different virtualization, in accordance with an embodiment

FIG. 29 illustrates cloning a service to run on a different virtualization, in accordance with an embodiment.

As illustrated in FIG. 29, in accordance with an embodiment, a source service 742A can be provisioned to a virtualization pool 749A based on a virtualization provider VC1 745A created by an account administrator. In accordance with an embodiment, the source service can be created from a source service type 743A that is derived from a source SDP 744A.

In accordance with an embodiment, in order to create 746 a clone service 742B of the source service to run on a different virtualization on a different virtualization pool 749B, a cloned copy 743B of the source service type can be created 747 with specified provider dependencies that includes a dependency on a different virtualization provider VC2 745B. The source SDP 748 can be loaded to the different virtualization as a cloned SDP 744B and used 748 to create the cloned service type.

After the cloned service type is created, the account administrator can run a clone-service command 746, e.g., "cadmin clone-service —sourceservice s1—servicetype st1_clone s1_clone", to clone the source service. In this command, the service s1 is the "source service", the service s1_clone is the "target service", and the argument '—servicetype' is optional. When the '—servicetype' is not specified, the target service would run on the same virtualization as the source service and would use the same provider types as the source service for satisfying its provider dependencies. When the '—servicetype' is specified, however, a validation can be performed to make sure that the specified service type is a clone of s1's service type (using the property set in the st1_clone).

In accordance with an embodiment, as part of the service cloning process, a command, e.g., "create-service—servicetype st1—virtualization vc1 s1", can be executed to create a new service (target service) using the specified service type (i.e. st1_clone), so that the created service can run in the desired virtualization configurations and with the desired provider dependencies. If the "—servicetype option" is not specified, the service type of the source service s1 can be used. The create-service command can be called either through ReST or through the commandline interface. Configuration and application changes can be extracted from the source service using an SME of the source service, and applied to the target service (i.e. st_clone) by invoking the SME of the target service.

The above-described steps in the service cloning process can be incorporated as part of the implementation of the clone-service command.

In accordance with an embodiment, each service, e.g., the source service and the target service, can have T2P tools/plugins installed in the service, so that the SME of the service can use the tools/plugins to extract the configuration and application changes from the source service, and apply the extracted changes to the target service. The T2P tools can provide utilities such as copyConfig, makeMovePlan and pasteConfig; and an SME can process the move plan before pasting it to the target service.

Figure 30:
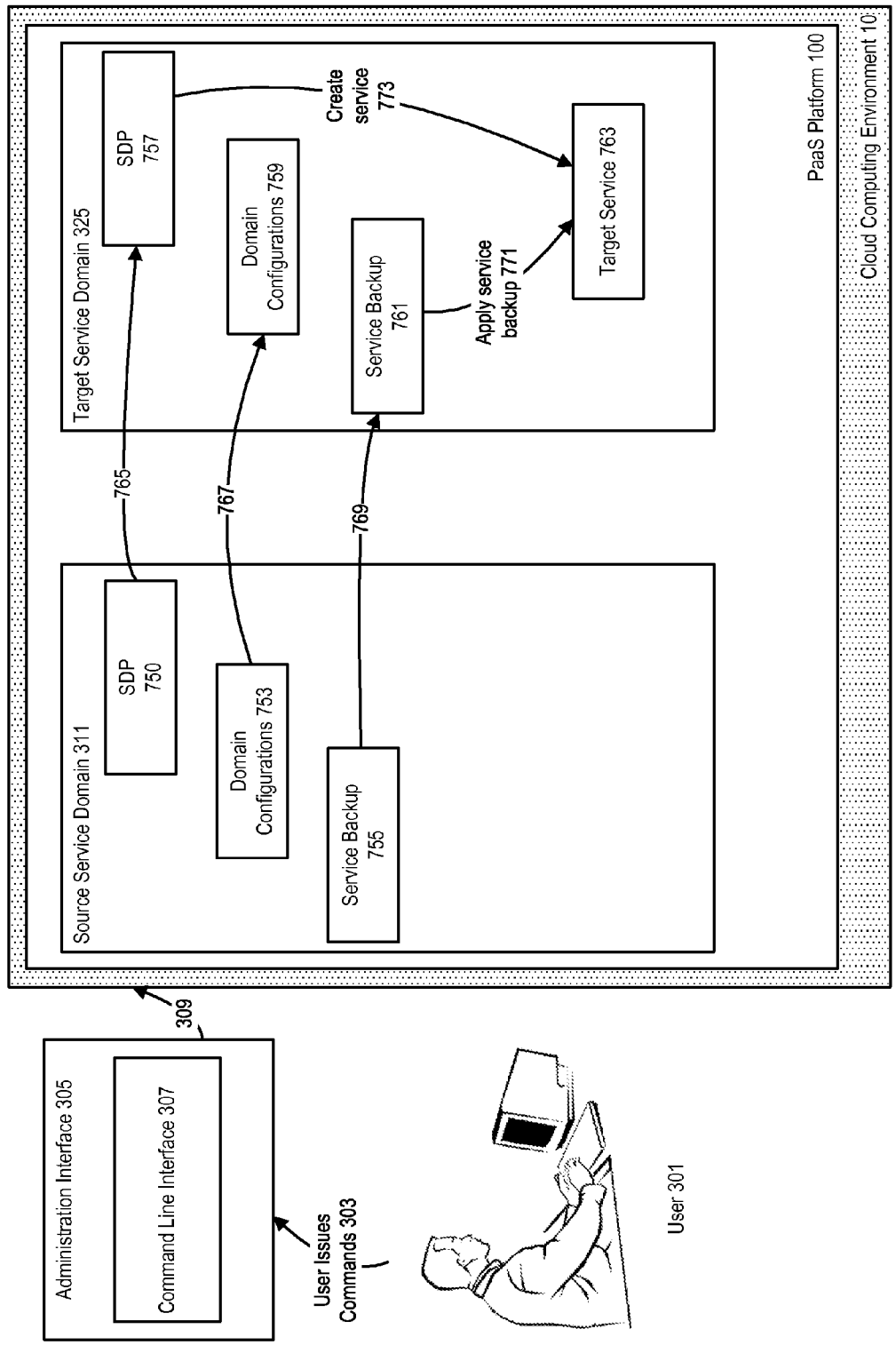
FIG. 30 illustrates cloning a service across service domains, in accordance with an embodiment.

FIG. 30 illustrates cloning a service across service domains, in accordance with an embodiment.

As shown in FIG. 30, in accordance with an embodiment, to clone a service from a source service domain to a target service domain, the SDP 750, the domain configurations 753 and the source service backup 755 can be imported 765, 767, 769 from the source service domain to the target service domain as an imported SDP 757; domain configurations 759 recreated; and a source service backup 761 imported. A target service 763 can be created 773 from the imported SDP in the target service domain, and the imported source service backup can be subsequently applied 771 to the target service.

Figure 31A:
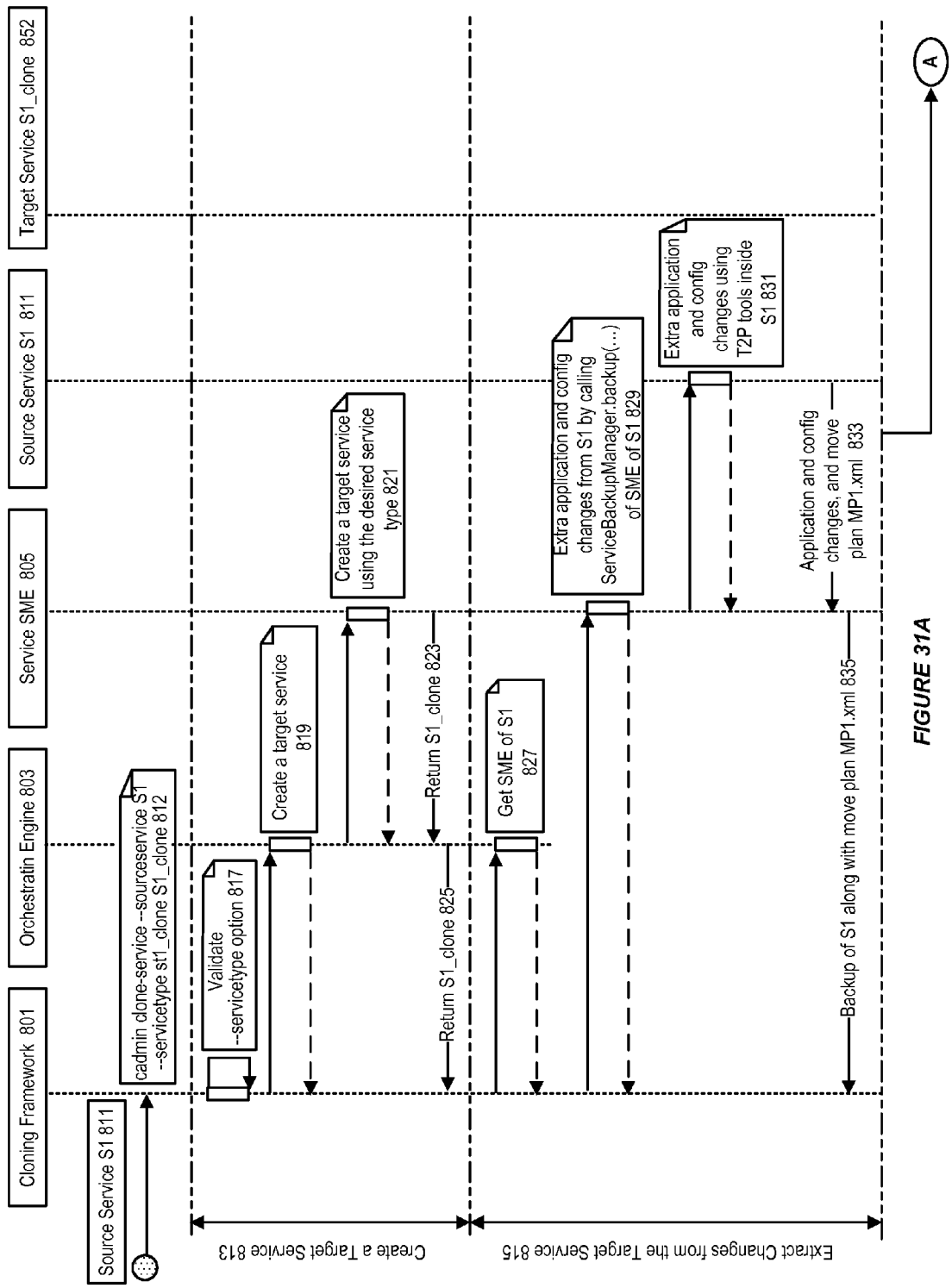
FIG. 31A is a sequence diagram that illustrates cloning a service within a service domain, in accordance with an embodiment.

FIG. 31A is a sequence diagram that illustrates cloning a service within a service domain, in accordance with an embodiment. As shown in FIG. 31A, in accordance with an embodiment, at step 812, an account administrator can issue a service cloning command, e.g., "cadmin clone-service—sourceservice S1—servicetype st1_clone S1_clone", to a service cloning framework 801 to clone a source service 811.

At step 817, which occurs in a first stage 813 of a service cloning process, a cloning framework 801, upon receiving the service cloning command, can validate the service type specified by the "—servicetype" option in the command to examine whether the specified service type is a clone of the service type of the source service. If the specified service type passes the validation, a target service can be created using the specified service type. If a service type is not specified in the service cloning command, the service type of the source service can be used to create the target service.

At step 819, the cloning framework invokes an orchestration engine 803 in a service domain to create the target service 852 using the desired service type.

At step 821, the orchestration engine can invoke an SME 805 to create the target service.

At step 823, the target service can be returned to the orchestration engine, which in turn can return the target service to the cloning framework at step 825.

At step 827, which occurs in a second stage 815 of the serve cloning process, the cloning framework can operate to invoke the SME of the source service via the orchestration engine.

At step 829, application and configuration changes from the source service can be extracted by, e.g., calling the ServiceBackupManager.backup( ) interface of the SME.

At step 831, the SME can further invoke the T2P tools/plugins installed in the source service to perform the extraction.

At step 833, the source service can return the extracted application and configuration changes to the SME of the source service, along with a move plan MP1.xml.

At step 835, the SME of the source service can create a backup file from the extracted changes and return the backup file to the cloning framework.

Figure 31B:
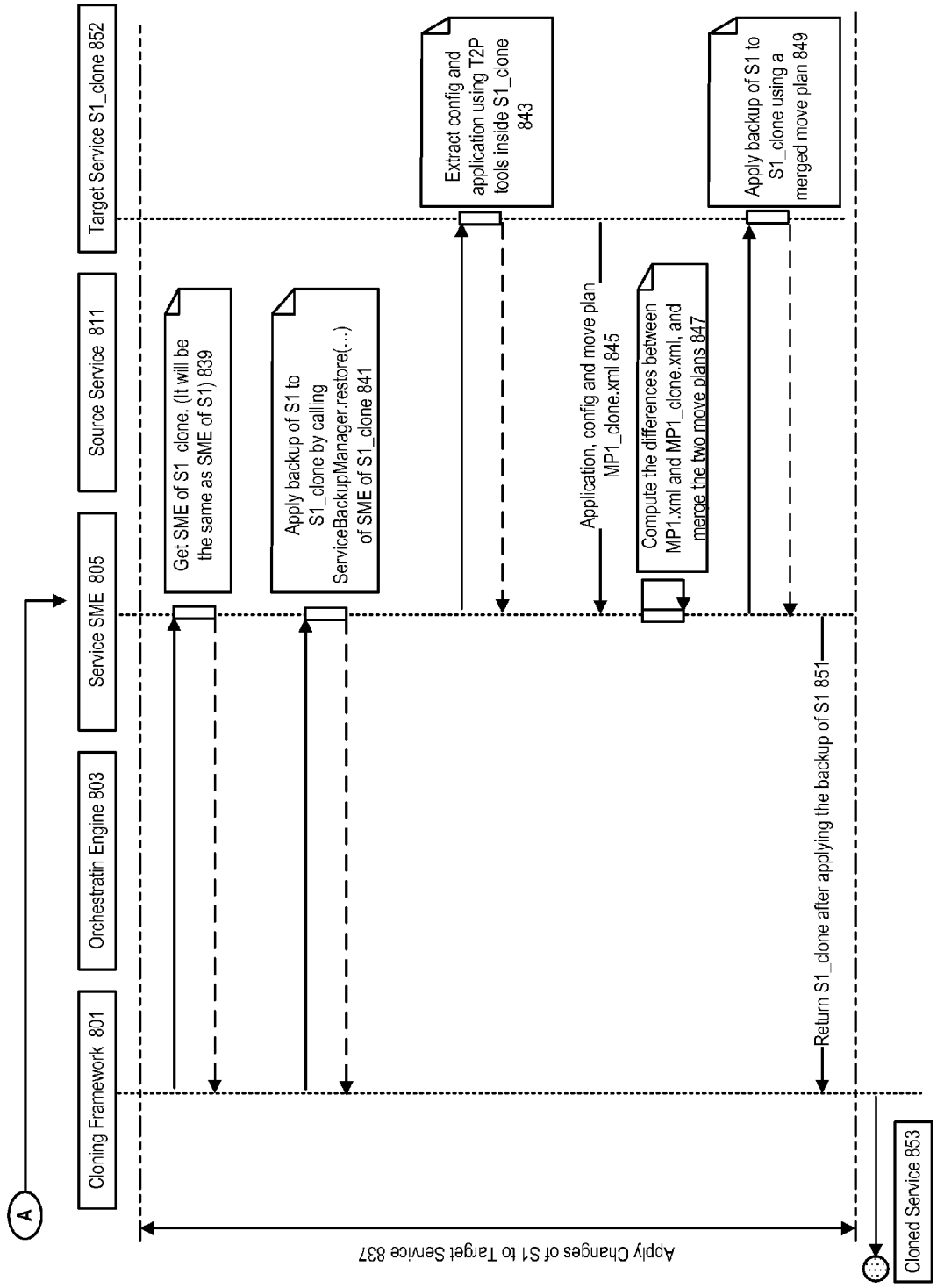
FIG. 31B is a continuation of the sequence diagram from FIG. 31A, in accordance with an embodiment.

FIG. 31B is a continuation of the sequence diagram from FIG. 31A, in accordance with an embodiment. As shown in FIG. 31B, the extracted application and configuration changes from the source service can be applied to the target service in a third stage 837 of the service cloning process.

At step 839, the cloning framework can invoke the SME of the target service created in FIG. 31A. The SME can be the same as the SME of the source service.

At step 841, the ServiceBackupManager.restore( ) interface of the SME of the target service can be used to apply the backup file of the source service, to the target service.

At step 843, the SME of the target service can extract configurations and applications from the target service using the T2P tools inside the target service.

At step 845, the extracted configurations and applications along with a move plan, e.g, MP1_clone.xml, can be returned to the SME of the target service.

At step 847, the target service SME can compute the differences between the move plan of the source service and the move plan of the target service, and merge the two move plans into a new move plan.

At step 849, the backup file of the source service can be applied to the target service using the new move plan.

At step 851, the target service with the backup file applied thereto can be returned to the cloning framework, and the target service, with the additional changes applied thereto, becomes a cloned copy 853 of the source service.

In accordance with an embodiment, an exemplary snippet of a move plan from a service is shown in Listing 7:

Listing 7

```
<movePlan>
    <movableComponent>
        <componentType>J2EEDomain</componentType>
        <componentName>base_domain</componentName>
        <version>12.1.2.0.0</version>
        <id>CLONE20130315163055755</id>
        <moveDescriptor>
            <configProperty>
                <name>Startup Mode</name>
                <value>PRODUCTION</value>
                <itemMetadata>
                    <dataType>STRING</dataType>
                    <scope>READ_WRITE</scope>
                </itemMetadata>
            </configProperty>
            <configGroup>
                <type>SERVER_CONFIG</type>
                <configProperty id="Server1">
                    <configProperty>
                        <name>Server Name</name>
                        <value>AdminServer</value>
                        <itemMetadata>
                            <dataType>STRING</dataType>
                            <scope>READ_ONLY</scope>
                        </itemMetadata>
                    </configProperty>
                    <configProperty>
                        <name>Listen Address</name>
                        <value>10.178.246.3</value>
                        <itemMetadata>
                            <dataType>STRING</dataType>
                            <scope>READ_WRITE</scope>
                        </itemMetadata>
                    </configProperty>
                    ...
                </configProperty>
                ...
            <configGroup>
                <type>DATASOURCE</type>
                <configProperty id="DataSource1">
                    <configProperty>
                        <name>DataSource Name</name>
                        <value>JDBC Data Source0</value>
                        <itemMetadata>
                            <dataType>STRING</dataType>
                            <scope>READ_ONLY</scope>
                        </itemMetadata>
                    </configProperty>
                    <configProperty>
                        <name>Url</name>
                        <value>jdbc:derby://localhost:1528
                            /sampledb;ServerName=localhost;
                            databaseName=sampledb</value>
                        <itemMetadata>
                            <dataType>STRING</dataType>
                            <scope>READ_WRITE</scope>
                        </itemMetadata>
                    </configProperty>
                    ...
            </configGroup>
            ...
        </moveDescriptor>
    </movableComponent>
</moveplan>
```

In accordance with an embodiment, the values of the elements with READ_WRITE scope can be changed by an SME to reflect the new values required by the target service.

Figure 32:
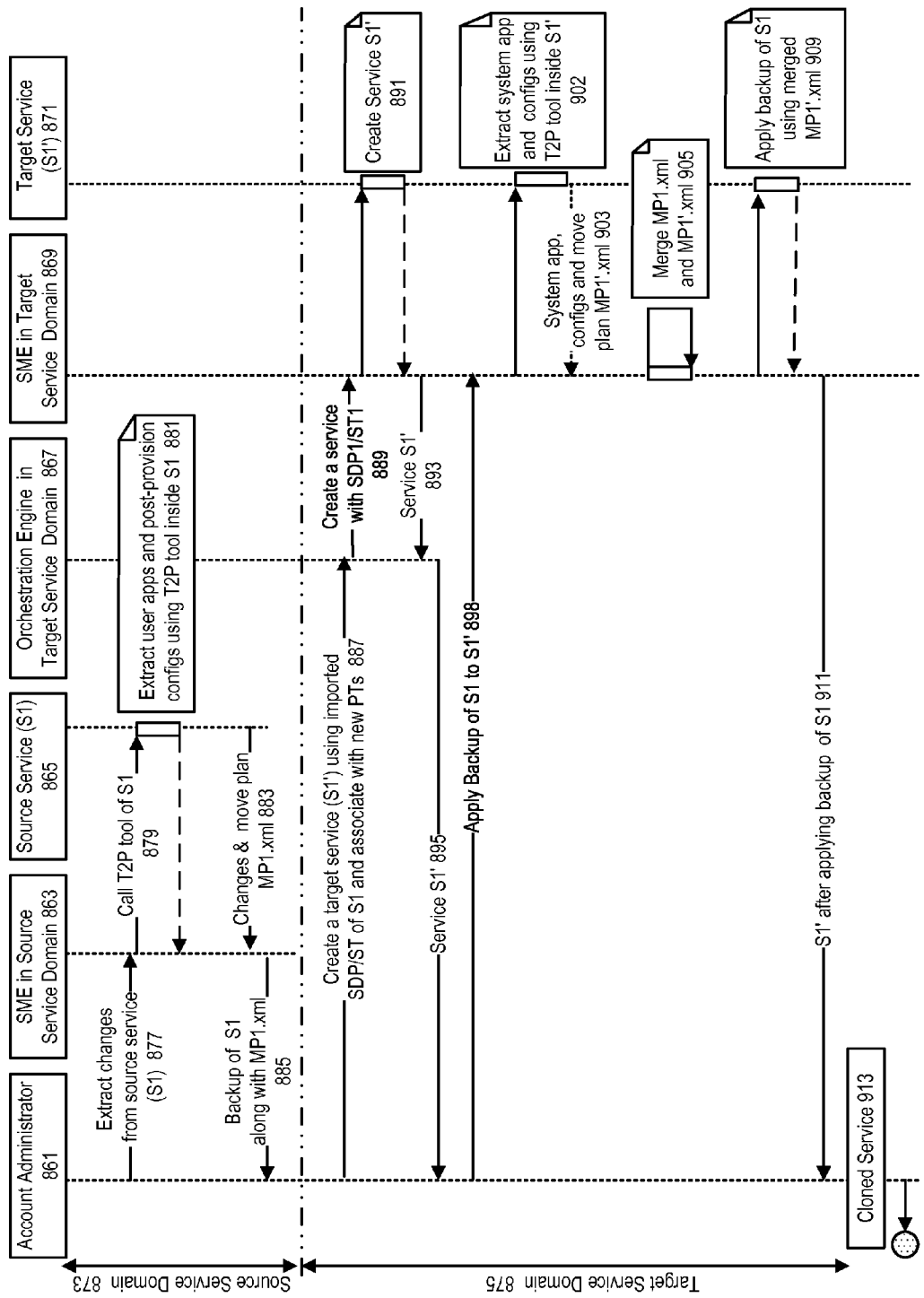
FIG. 32 is a sequence diagram that illustrates cloning a service across service domains, in accordance with an embodiment.

FIG. 32 is a sequence diagram illustrating cloning a service across service domains, in accordance with an embodiment. As shown in FIG. 32, in accordance with an embodiment, at step 877, an account administrator 861 can send a request to an SME 863 of a source service in a source service domain 873 for extracting configuration and application changes (e.g., user applications and post-provision configurations) of a source service (S1) 865.

At step 879, the SME of the source service invokes one or more T2P tools of the source service.

At step 881, the T2P tools of the source service are used to extract user applications and post-provision configurations from the source service.

At step 883, the source service returns the extracted configuration and application changes, along with a move plan (e.g., MP1.xml), to the SME of the source service.

At step 885, the SME of the source service creates a backup copy of the source service, which can include the extracted configuration and application changes and the move plan, and return the backup copy to the account administrator.

At step 887, the account administrator sends a request to an orchestration engine 867 in a target service domain 875, for creating a target service (S1') using an imported SDP/service type of the source service and associating the new service with new provider types in the target service domain.

At step 889, the orchestration engine invokes an SME 869 in the target service domain to create the target service 871.

At steps 891, 893 and 895, the target service S1' is created and returned to the account administrator through the SME and the orchestration engine in the target domain.

At step 898, the account administrator requests the SME in the target domain to apply the backup of the source service to the created target service.

At steps 902 and 903, the SME in the target domain invokes the T2P tools inside the new service to extract system applications and configurations from the new service, along with a move plan MP1'.xml.

At step 905, the SME in the target domain computes the differences between the move plan of the source service and the move plan of the created new service, and merges them into a new move plan.

At step 909, the SME in the target domain applies the backup of the source service to the created target service using the new move plan.

At step 911, the SME in the target domain returns the created target service that includes the backup of the source service to the account administrator, where the created target service can include the service application and configurations, as well as user applications and post-provision configurations. The target service, with the additional changes applied thereto, becomes a cloned copy 913 of the source service.

Figure 33:
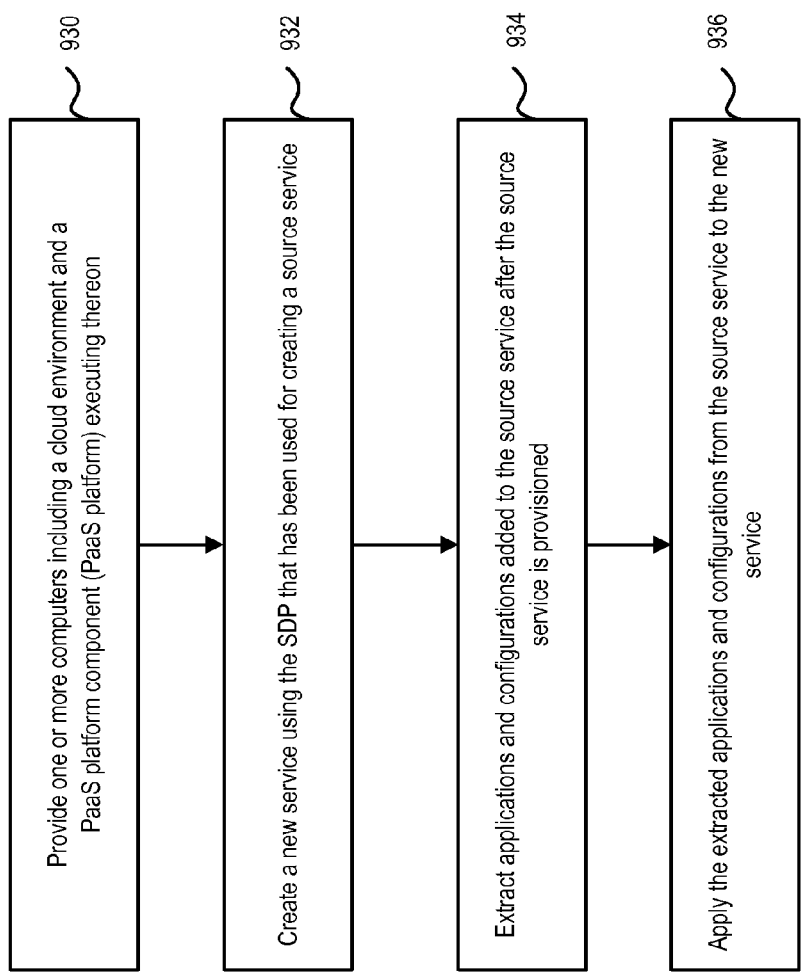
FIG. 33 illustrates a method for providing a clone service within a service domain, in accordance with an embodiment.

FIG. 33 illustrates a method for providing a clone service within a service domain, in accordance with an embodiment. As shown in FIG. 33, at a first step 930, one or more computers including a cloud environment and a PaaS platform component (PaaS platform) executing thereon, are provided.

At step 932, a new service is created using the SDP that has been used for creating a source service.

At step 934, applications and configurations added to the source service after the source service is provisioned are extracted, e.g. user applications and related configurations.

At step 936, the extracted applications and configurations from the source service are applied to the new service.

Figure 34:
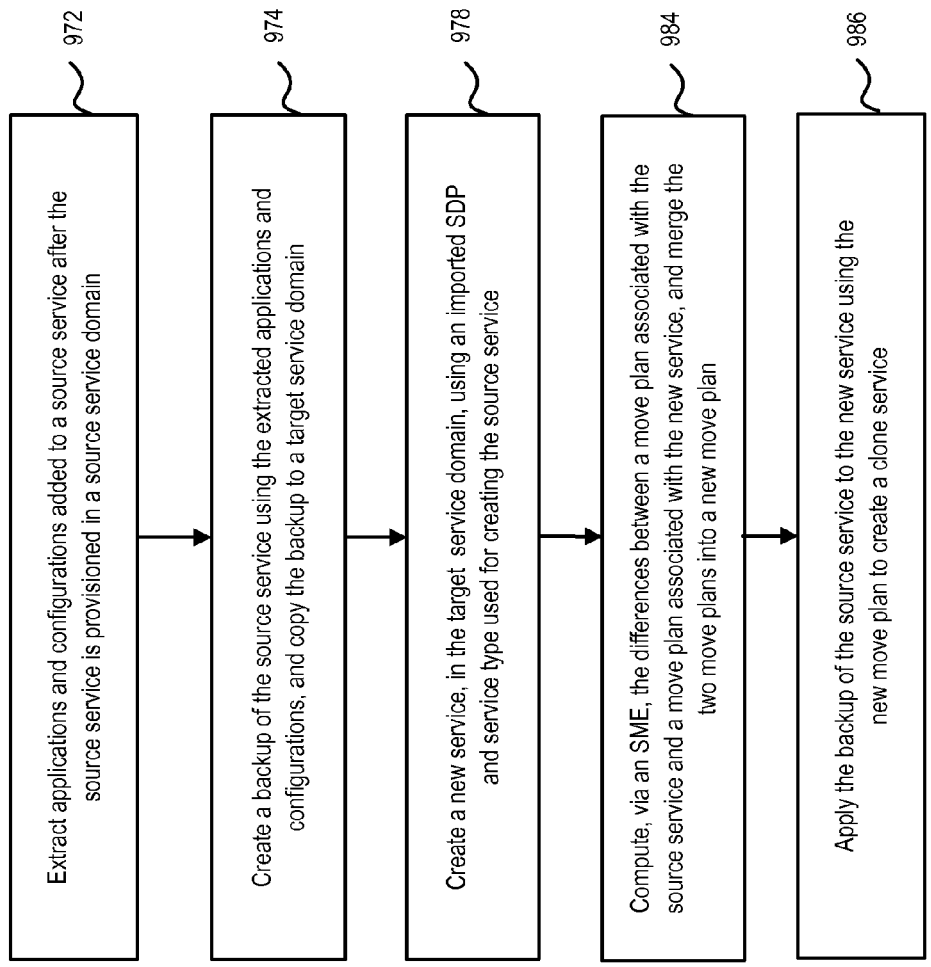
FIG. 34 illustrates a method for providing a clone service across service domains, in accordance with an embodiment.

FIG. 34 illustrates a method for providing a clone service across service domains, in accordance with an embodiment. As shown in FIG. 34, at step 972, applications and post-provision configurations added to a source service after the source service is provisioned in a source service domain, are extracted.

At step 974, a backup of the source service is created using the extracted applications and configurations, and copied to a target domain.

At step 978, a new service is created in a target service domain using an imported SDP and service type used for creating for the source service.

At 984, an SME in the target service domain computes the differences between a move plan associated with the source service and a move plan associated with the new service, and merge the two plans into a new move plan.

At step 986, the backup of the source service is applied to the new service using the new move plan to create a clone service.

Public Interfaces for Service Cloning

In accordance with an embodiment, provided below are example interfaces for service cloning as described above. The example interfaces are provided for the purposes of illustration and description, and are not intended to be exhaustive or to limit the invention to the precise forms disclosed.

The clone-service-type command: Cloning of the service type is achieved using export-service-type and import-service-type commands, and there is no need to have explicit clone-service-type command. An example of cloning a service type can be:

```
$padmin export-service-type --servicetype st1 st1.zip
$padmin extract-move-plan -moveplan st1.xml st1.zip
$; edit the extract move plan to modify the parameters.
$padmin import-service-type -moveplan st1.xml st1.zip
```

The clone-service command: The clone-service command can be exposed to the cloud account administrator to clone a service within a CloudLogic domain. The command syntax can be:

```
cadmin clone-service
    --sourceservice name-of-the-source-service
    [--tenant name-of-the-tenant]
    [environment name-of-the-environment]
    [--servicetype name-of-the-service-type-to-be-used]
    name-of-the-target-service
```

In this command, the "—service-type" argument is an optional argument used when the target service needs to use a different virtualization configuration and/or different provider types for provider dependencies. When the "—servicetype" is not specified, then the target service would be created using the service type of the source service. When the "—servicetype" is specified, then the validation would be done to make sure that the specified servicetype is a clone/copy of source service's service type. If the clone-service is attempted through an arbitrary service type, then the command would fail.

The backup-service command: The backup-service command can be exposed to the cloud account administrator in order to take the backup of the source service. This command would be used when cloning the service from one domain to another. The command syntax can be illustrated as:

```
cadmin backup-service
    [--retrieve true-or-false]
    [--tenant name-of-the-tenant]
    --backupfile backup-file-name name-of-the-source-service
```

The restore-service command: The restore-service command can be exposed to the cloud account administrator in order to restore the service in another CloudLogic domain. This command would be used when cloning the service from one domain to another. The command syntax can be illustrated as:

```
cadmin restore-service
    --backupfile backup-file-name
    [--tenant name-of-the-tenant]
    [environment name-of-the-environment]
    [--servicetype name-of-the-service-type-to-be-used]
    name-of-the-target-service
```

Private Interfaces for Service Cloning

In accordance with an embodiment, the commands and tools used for service cloning can be sme-based modules, which can provide the base implementations for the backup and restore functionality. As an illustrative example, invocation of T2P tools viz., copyConfig.sh, makeMovePlan.sh, pasteConfig.sh would be invoked from a sme-base. The specific SMEs need to call the sme-base by supplying the necessary arguments for invoking those T2P commands.

Example Implementation for Service Cloning

Provided below are illustrative examples of cloning a service within a service domain and across service domains, in accordance with an embodiment.

EXAMPLE 1

Cloning a service within the CloudLogic domain
cadmin clone-service—sourceservice s1 s1_clone
The above command will create s1_clone which is a copy of s1. The s1_clone can get created in the same virtualization configuration as s1, and the s1_clone can use the same provider types as s1 for its provider dependencies

EXAMPLE 2

Cloning a service within the CloudLogic domain using a cloned service type. In order for the target service to use a different virtualization and/or different provider types for various provider dependencies, the PaaS administrator must first clone the service type of the source service, as illustrated below:

```
// Clone the service type of service s1 (i.e., st1) into st1_clone
// We assume the vc2 exists and is of same virtualization type as // defined in service s1's SDP
// The dependency names viz., OPSS_DB_DEPENDENCY and
IDM_DEPENDENCY
// are as defined in the service s1's SDP and all the provider types //used already
// exist in the system.
padmin clone-service-type --source st1 virtualization --virtualization vc2
--dependency-names
OPSS_DB_DEPENDENCY=oracle-db-provider-type:
IDM DEPENDENCY=oidprovidertype st1_clone
```

Once the st1_clone is set up by the PaaS administrator, the cloud account administrator(s) can use this st1_clone while cloning the service that was created from st1. For example:
Cadmin clone-service—sourceservice s1—servicetype st1_clone s1_clone
The above command will create s1_clone which is a copy of s1. The s1_clone will use a different virtualization configuration and different provider types than s1 as it is configured in service type st1_clone.

EXAMPLE 3

Clone a service across the CloudLogic domains. In order to clone the service from one CloudLogic domain to another CloudLogic domain, the commands need to be executed in both domains. In the source service domain, the following commands can be run:

```
//Export all the virtualization configurations, service types and //all
the SDPs from source service domain.
padmin exportdomain<<arguments>> source_domain.zip
//Extract the backup from the source service
cadmin backup-service --backupfile /tmp/s1_backup.zip s1
```

In the target service domain, the follow commands can be run:

```
// Import all the virtualization configurations, service types and
//all the SDPs from source service domain.
padmin importdomain <<arguments>> source_domain.zip
// In the target service domain the names of virtualization configurations,
// service types and names of the SDPs will remain same as what
// it was in source service domain
// Download the source service's backup from source service domain into
/tmp
// Now create a target service and apply the backup
cadmin create-service --service-type st1 s1_clone
cadmin restore-service --backupfile /tmp/s1_backup.zip s1_clone
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for replicating a source service domain to a target service domain in a cloud computing environment, comprising:
   one or more computers including a processor and memory, and a cloud computing environment executing thereon;
   a platform component provided as an installable software suite within the cloud computing environment, that supports provisioning of enterprise applications as services, including
      providing, for each service type of a plurality of service types, a service definition package that includes information that enables the cloud computing environment to provide the service type,
      providing, for each service type of the plurality of service types, a service management engine associated with the service type that enables provisioning of the service type within one or more service domains; and
   a framework module that includes one or more plugins that enable replication of service domains within the cloud computing environment and are invoked to replicate a source service domain, having one or more service types, to a target service domain, within the cloud computing environment, including
      determining a source service domain configuration,
      determining a move plan for use with the target service domain,
      copying the one or more service types from the source service domain to the target service domain, and
      configuring a target service domain configuration to the move plan.

2. The system of claim 1, wherein a domain configuration archive contains one or more service domain configurations of the source service domain and a move plan for each service domain configuration of the one or more service domain configurations.

3. The system of claim 2, wherein the move plan for each service domain configuration includes one or more move plan files with customizable parameters for a particular service domain.

4. The system of claim 2, wherein the one or more move plan files are extracted from the domain configuration archive and customized at a user interface based on requirements of the target service domain, to create one or more customized move plans.

5. The system of claim 4, wherein the one or more customized move plans are used by the framework module and plugins to recreate the one or more service domain configurations in the target service domain.

6. The system of claim 1, wherein the one or more service domain configurations include at least one of a virtualization configuration, a service definition package configuration, a service type configuration, a provider type configuration, a service resource type configuration, or a tenant structure configuration.

7. The system of claim 1, wherein the move plan can be edited based on requirements of the target service domain.

8. A method of replicating a source service domain to a target service domain in a cloud computing environment, comprising:
   providing, at one or more computers including a processor, and a cloud computing environment executing thereon, a platform component as an installable software suite that supports provisioning of enterprise applications as services, including
      providing, for each service type of a plurality of service types, a service definition package that includes information that enables the cloud computing environment to provide the service type,
      providing, for each service type of the plurality of service types, a service management engine associated with the service type that enables provisioning of the service type within one or more service domains; and
   replicating a source service domain, having one or more service types, to a target service domain, within the cloud computing environment, including
      determining a source service domain configuration,
      determining a move plan for use with the target service domain,
      copying the one or more service types from the source service domain to the target service domain, and
      configuring a target service domain configuration according to the move plan.

9. The method of claim 8, wherein a domain configuration archive contains one or more service domain configurations of the source service domain and a move plan for each service domain configuration of the one or more service domain configurations.

10. The method of claim 9, wherein the move plan for each service domain configuration includes one or more move plan files with customizable parameters for a particular service domain.

11. The method of claim 9, wherein the one or more move plan files are extracted from the domain configuration archive and customized at a user interface based on requirements of the target service domain, to create one or more customized move plans.

12. The method of claim 11, wherein the one or more customized move plans are used by the framework module and plugins to recreate the one or more service domain configurations in the target service domain.

13. The method of claim 8, wherein the one or more service domain configurations include at least one of a virtualization configuration, a service definition package configuration, a service type configuration, a provider type configuration, a service resource type configuration, or a tenant structure configuration.

14. The method of claim 8, wherein the move plan can be edited based on requirements of the target service domain.

15. A non-transitory computer readable storage medium, including instructions stored thereon which when read and executed by one or more computers cause the one or more computers to perform the steps comprising:
   providing, at the one or more computers including a processor, and a cloud computing environment executing thereon, a platform component as an installable software suite that supports provisioning of enterprise applications as services, including
      providing, for each service type of a plurality of service types, a service definition package that includes information that enables the cloud computing environment to provide the service type,
      providing, for each service type of the plurality of service types, a service management engine associated with the service type that enables provisioning of the service type within one or more service domains; and
   replicating a source service domain, having one or more service types, to a target service domain, within the cloud computing environment, including determining a source service domain configuration, determining a move plan for use with the target service domain, copying the one or more service types from the source service domain to the target service domain, and configuring a target service domain configuration according to the move plan.

16. The non-transitory computer readable storage medium of claim 15, wherein a domain configuration archive contains one or more service domain configurations of the source service domain and a move plan for each service domain configuration of the one or more service domain configurations.

17. The non-transitory computer readable storage medium of claim 16, wherein the move plan for each service domain configuration includes one or more move plan files with customizable parameters for a particular service domain.

18. The non-transitory computer readable storage medium of claim 16, wherein the one or more move plan files are extracted from the domain configuration archive and customized at a user interface based on requirements of the target service domain, to create one or more customized move plans.

19. The non-transitory computer readable storage medium of 18, wherein the one or more customized move plans are used by the framework module and plugins to recreate the one or more service domain configurations in the target service domain.

20. The non-transitory computer readable storage medium of claim 15, wherein the one or more service domain configurations include at least one of a virtualization configuration, a service definition package configuration, a service type configuration, a provider type configuration, a service resource type configuration, or a tenant structure configuration.

* * * * *